US011951416B2

(12) United States Patent
Kaddoura et al.

(10) Patent No.: US 11,951,416 B2
(45) Date of Patent: Apr. 9, 2024

(54) CONVECTION ENHANCED EVAPORATION

(71) Applicant: Regents of the University of Minnesota, Minneapolis, MN (US)

(72) Inventors: Mustafa F. Kaddoura, Minneapolis, MN (US); Natasha C. Wright, Shakopee, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 17/931,520

(22) Filed: Sep. 12, 2022

(65) Prior Publication Data

US 2023/0082501 A1 Mar. 16, 2023

Related U.S. Application Data

(60) Provisional application No. 63/243,324, filed on Sep. 13, 2021.

(51) Int. Cl.
| | | |
|---|---|---|
| B01D 1/22 | (2006.01) | |
| B01D 1/00 | (2006.01) | |
| C02F 1/00 | (2023.01) | |
| C02F 1/04 | (2023.01) | |
| C02F 1/08 | (2023.01) | |

(52) U.S. Cl.
CPC .............. *B01D 1/22* (2013.01); *B01D 1/0064* (2013.01); *B01D 1/0082* (2013.01); *C02F 1/008* (2013.01); *C02F 1/048* (2013.01); *C02F 1/08* (2013.01); *C02F 2201/005* (2013.01); *C02F 2209/02* (2013.01); *C02F 2209/38* (2013.01); *C02F 2209/40* (2013.01)

(58) Field of Classification Search
CPC ...... B01D 1/0064; B01D 1/0082; B01D 1/22; C02F 1/008; C02F 1/048; C02F 1/08; C02F 2201/005; C02F 2209/02; C02F 2209/38; C02F 2209/40
See application file for complete search history.

(56) References Cited

U.S. PATENT DOCUMENTS

| | | | | |
|---|---|---|---|---|
| 6,911,121 B1 * | 6/2005 | Beckman | ................. | B01D 1/22 261/153 |
| 8,579,264 B1 * | 11/2013 | Fowles | ................... | C02F 1/048 261/78.2 |
| 10,800,668 B2 * | 10/2020 | Sakaray | ............... | B01D 1/0082 |
| 11,003,175 B2 * | 5/2021 | Xenos | ...................... | G06N 7/00 |
| 11,406,910 B2 * | 8/2022 | Bhalekar | ................. | B01D 1/16 |
| 11,416,955 B2 * | 8/2022 | Elbsat | ...................... | G06N 5/02 |
| 2016/0096741 A1 * | 4/2016 | Lee | .......................... | B01D 1/28 203/1 |

(Continued)

FOREIGN PATENT DOCUMENTS

CN 112250130 A * 1/2021 ........... B01D 53/002

OTHER PUBLICATIONS

PE2E Search Clarivate Analytics machine translation of CN-112250130-A obtained Jun. 28, 2023. (Year: 2023).*

*Primary Examiner* — Jonathan Miller
(74) *Attorney, Agent, or Firm* — Schwegman Lundberg & Woessner, P.A.

(57) ABSTRACT

A system includes an evaporator having sensors and selectable operational parameters and a controller configured to receive data and determine operational configuration for the evaporator. Selectable parameters relate to system heating, liquid flow rate, air flow rate, and environmental data.

10 Claims, 21 Drawing Sheets

(56) References Cited

U.S. PATENT DOCUMENTS

| | | |
|---|---|---|
| 2018/0161694 A1* | 6/2018 | Lee ..................... B01D 1/2896 |
| 2020/0090289 A1* | 3/2020 | Elbsat .................... G06Q 10/04 |
| 2021/0060452 A1* | 3/2021 | Bhalekar ................. B01D 1/16 |
| 2021/0294399 A1* | 9/2021 | Belvant More .... G05B 13/0265 |

* cited by examiner

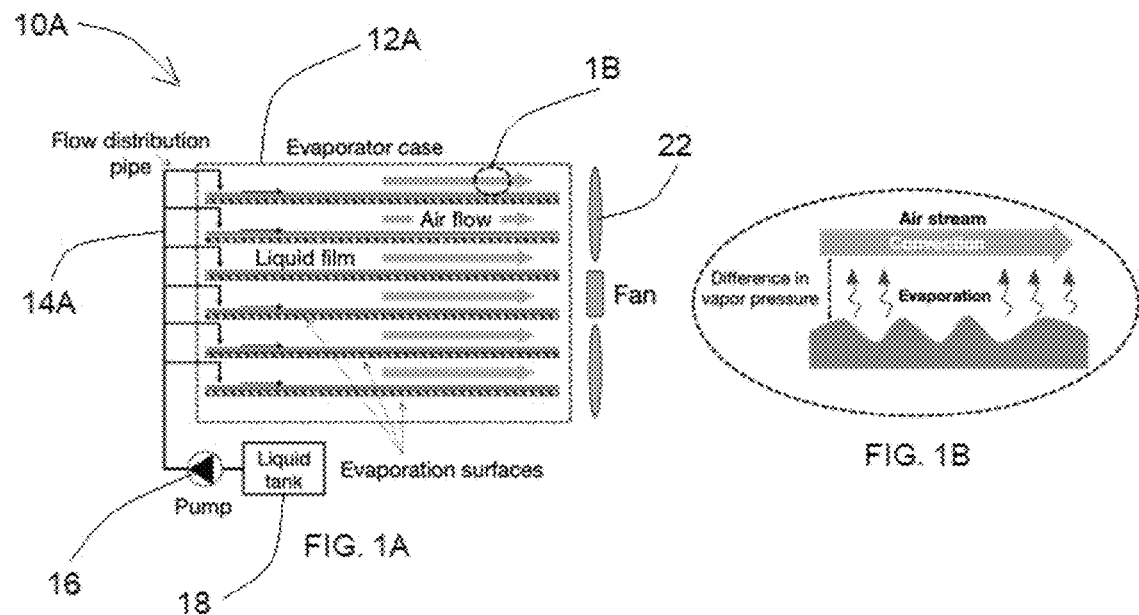
FIG. 1A
FIG. 1B
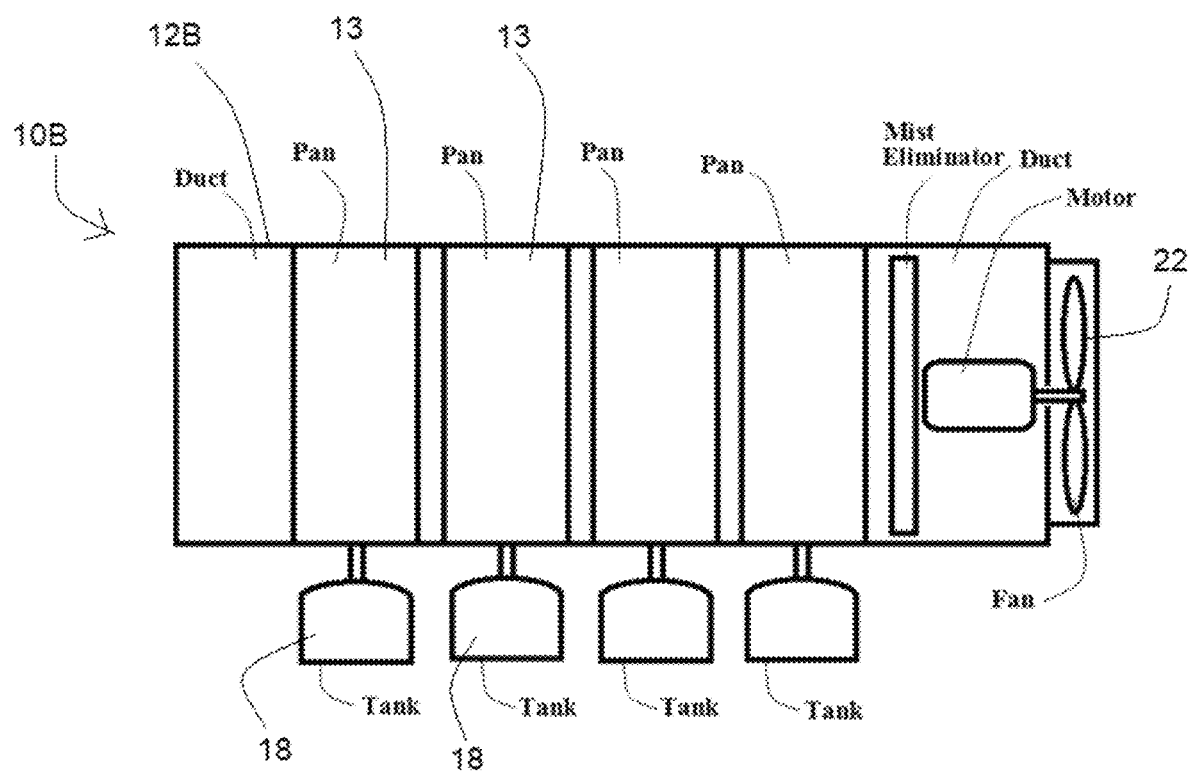
FIG. 2

CONVECTION ENHANCED EVAPORATION

CLAIM OF PRIORITY

This patent application claims the benefit of U.S. Provisional Patent Application Ser. No. 63/243,324, filed Sep. 13, 2021, which is hereby incorporated by reference herein in its entirety.

STATEMENT REGARDING FEDERALLY SPONSORED RESEARCH OR DEVELOPMENT

This invention was made with government support under Grant Number R21AC10130 awarded by the US Bureau of Reclamation. The government has certain rights in the invention.

TECHNICAL FIELD

This document pertains generally, but not by way of limitation, to processing brine.

BACKGROUND

Brine, also known as a concentrate, is a byproduct of desalination and industrial processes. Brine can be a highly saline water stream. Poor management of brine effluent can lead to negative environmental impacts due to the high concentration of dissolved salts and other chemical contaminants. Estimates show that brine disposal cost ranges from 5 to 33% of the total desalination cost depending on the contaminants present.

Regulations increasingly mandate industries to treat brine effluents to reach zero liquid discharge, further increasing the cost and energy demand of brine management. Additionally, most reviews of inland brine management techniques focus on large facilities processing greater than 100 m³/day brine. For small-volume brine producers, the expected specific cost and energy for treatment will be higher than that cited in the literature, as small size significantly works against thermal efficiency.

Traditional brine management methods can be categorized as brine disposal methods (in which brine is discarded as waste), and as brine treatment methods (in which the aim is to minimize brine volume, recover freshwater, and/or produce salt byproducts). Brine is commonly disposed of via several methods including surface water discharge, sewer water discharge, deep-well injection, land application, and evaporation ponds. These brine disposal methods are unsustainable and may have negative environmental impacts such as pollution of the marine environment, groundwater pollution, and soil salinization, in addition to being cost-prohibitive. Brine treatment methods, such as multi-effect distillation, generally mitigate issues of direct environmental pollution but are associated with high energy consumption and upfront cost, which limits their implementation and adoption.

To reduce the environmental impact of brine disposal, some industries have turned to desalination techniques like multi-effect evaporation and multi-stage distillation, but these systems are energy-intensive and cost-prohibitive for small volume treatment which prohibits their adoption.

One approach, known as WAIV, Wind-Aided Evaporation, was introduced to increase the evaporation rate from evaporation ponds; however, WAIV is limited by wind availability and has certain operating challenges.

The title of US 20200207633 refers to a method and device for accelerating evaporation of brine in plateau salt lake.

The title of U.S. Pat. No. 11,406,910 refers to an apparatus for maximizing effluent liquid evaporation.

SUMMARY

There is a need for environmentally sustainable, energy-efficient, and cost-effective brine management methods especially for small-scale, decentralized desalination plants and industrial systems.

Convection-enhanced evaporation (CEE) is an evaporation technology for brine management and wastewater volume reduction. A device employing CEE technology can include a set of horizontally packed hydrophilic evaporation surfaces at a uniform vertical spacing. The capacity of the evaporation system can be increased by adding additional evaporation surfaces, making the system modular and easy to fabricate. Liquid is uniformly released by means of a flow distribution pipe and orifices along the width of each evaporation surface forming a thin film. A fan is fixed at the opposite side of the liquid injection and provides a driving force for air flow. As air flows over the liquid film, the difference in vapor pressure between the air and liquid surfaces induces evaporation. The humid air leaves the evaporator, and any remaining liquid that is not evaporated is recycled to a tank.

An evaporation system can have elements arranged horizontally, vertically, or concentrically. In one example, the air and liquid flow pattern aligned in parallel. For example, the air flow and the liquid flow can both move left to right in the example illustrated in FIG. 1. In another example, the air and liquid flow pattern can be in opposite directions (counter-flow). For example, the air flow can move from right to left and the liquid flow can both move left to right in the example illustrated in FIG. 1. In another example, the air and liquid flow pattern can be cross-wise. For example, the liquid can be configured to fall downward, and air flow can be configured to pass horizontally.

A CEE system can have evaporation surfaces packed in any configuration (horizontal, vertical, concentric) with a fluid film flowing over the surfaces, along with a fan to induce air flow; and to have control over the air speed, liquid flow rate and temperature.

Various configurations of a CEE system can be optimized and controlled in the method disclosed herein. In one example, a CEE system (or an evaporation system) is configured in a horizontal configuration in which the evaporator surfaces and the air flow is aligned horizontally.

Examples of the present subject matter can be included in a desalination plant in arid areas or can be used in small-scale industries and for large industrial plants.

Compared to traditional evaporation processes, such as multi-effect evaporation, an example of the present subject matter consumes five times less thermal energy, which reduces the operating cost and the carbon footprint. Compared to other commercial technologies, one example of the present subject matter has a lower footprint area, lower thermal and electric consumption, and lower total cost. This makes one example of the present subject matter a viable and competitive system.

One example includes a modular brine/wastewater volume reduction method.

One example includes a system configured for on-site treatment of produced wastewater by oil and gas sector. The oil and natural gas production sector produces highly saline water, known as "produced water", which can contain residual oil, dissolved organic compounds, and production chemicals. The U.S. generates around 9 million m³/day of produced water from oil and gas drilling techniques. Usually, produced water is disposed of by deep-well injection; however, this disposal method is costly especially when wastewater needs to be trucked for large distances to the disposal well. On-site treatment and reuse of produced water in oil and gas extraction is increasingly becoming a preferred option to address both environmental and economic challenges.

One example of the present subject matter can be part of desalination process to produce freshwater.

Thermal desalination processes mainly include two steps: evaporation followed by condensation. A convection enhanced evaporation system can be used in the evaporation step because of its compact design, low cost, and energy consumption, and can handle different ranges of salinity (brackish water, seawater, industrial wastewater).

In one example, a controller includes a processor coupled to memory and an interface. The processor is configured to execute instructions for receiving weather data corresponding to local conditions or forecast conditions. The processor executes instructions to receive CEE system information (such as capacity for fluid flow rate, air flow rate, and a measure of surface area for evaporation) and based on the system information, the received weather data, stored information (such as material cost data, energy cost data, time budget), and other data received via the interface (such as a user-selection), the processor can control the operation of the CEE system. Controlling the operation can include modulating power delivery to a fluid pump, a fan motor, a thermal element, or engaging and disengaging modules of a multi-part system of a CEE system. In this manner, the controller can process the fluid in an efficient manner, that is, at a lower operational cost.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

The patent or application file contains at least one drawing executed in color. Copies of this patent or patent application publication with color drawing(s) will be provided by the Office upon request and payment of the necessary fee.

FIGS. 1A and 1B illustrate a schematic of a convection enhanced, according to one example.

FIG. 2 illustrates a schematic of a convection enhanced, according to one example.

DETAILED DESCRIPTION

Figure 3:
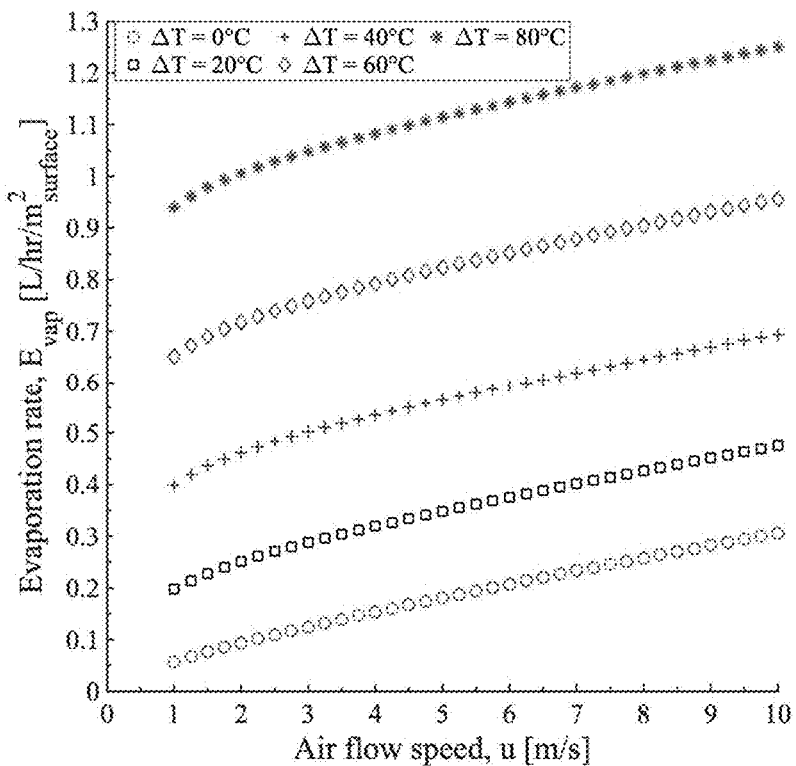
FIG. 3 illustrates evaporation performance as a function of air flow speed, and temperature difference between liquid inlet and ambient, according to one example.

Convection-enhanced evaporation (CEE) can be used for desalination and industrial brine/wastewater volume reduction. For example, CEE can be used for inland desalination, desalination plants in arid and semi-arid areas, industrial plants of all sizes (small-scale industries and large-scale ones). CEE can be configured as a modular device that can be scaled up for different sizes. Its flexible design allows for wide variations in footprint area and total cost. Also, CEE is a relatively simple design which results in low maintenance costs.

CEE can also be used for on-site treatment of produced wastewater by the oil and gas sector. Oil and natural gas production produces highly saline water, known as "produced water", which can contain residual oil, dissolved organic compounds, and production chemicals. Usually, produced water is disposed of by deep-well injection; however, this disposal method is costly especially when wastewater needs to be trucked for large distances to the disposal well. On-site treatment and reuse of produced water in oil and gas extraction is increasingly becoming a preferred option to address both environmentally and economically challenges.

CEE can also be part of desalination process to produce freshwater. Thermal desalination processes mainly include two steps: evaporation followed by condensation. CEE can be used in the evaporation step because of its compact design, low cost, and energy consumption, and can handle different ranges of salinity (such as brackish water, seawater, and industrial wastewater).

This section includes a description of an evaporation device, according to one example. FIGS. 1A and 1B depict a schematic for one example of a convection enhanced evaporation system.

In FIG. 1A, the evaporation is by air convection from the horizontally aligned surfaces within duct 12A. A liquid is released as a thin film over the horizontally aligned surfaces via flow distribution system 14A. An evaporation surface can also be called a tray. The liquid (fluid) is delivered to the trays by pump 16 drawing from tank 18. The air flow is induced by fan 22. The evaporation rate is proportional to the difference in vapor pressure between the flowing air and the liquid-air interface. It is noted that an increase in difference in vapor pressures and an increase in air speed both increase the evaporation rate.

An example of system 10B is depicted in FIG. 2. In the figure, duct 12B carries a series of pans, or evaporations surfaces, here depicted in some instances as surfaces within module 13. Fluid not evaporated and passed through the surfaces is collected in tanks 18, some of which are labelled. Air is carried through the system by motorized fan 22. Fan 22 is powered by an electric motor, and as discussed elsewhere in this document, the power drawn by the motor can be modulated for efficiency.

The system illustrated includes components, some of which are shown here as the rear duct, fan module, pan, mist eliminator, fan duct, fan blade, motor, flush tank, and base frame. The configuration shown allows for high evaporation rate, small footprint, low cost, low energy consumption, and modular construction which allows for incremental capacity adjustments.

The graph presented in FIG. 3 depicts evaporation performance as a function of air flow speed, and temperature difference between liquid inlet and ambient, for one example of the present subject matter.

Figure 4:
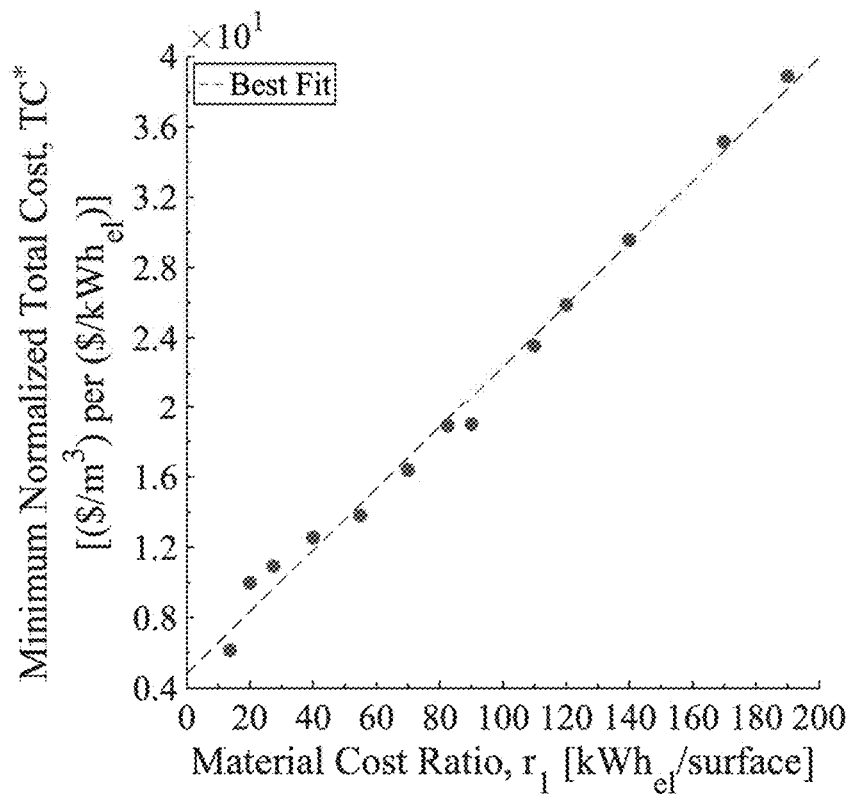
FIG. 4 illustrates total cost as a function of material cost, according to one example.

The graph in FIG. 4 presents total cost as a function of material cost, for one example of the present subject matter.

Figure 5:
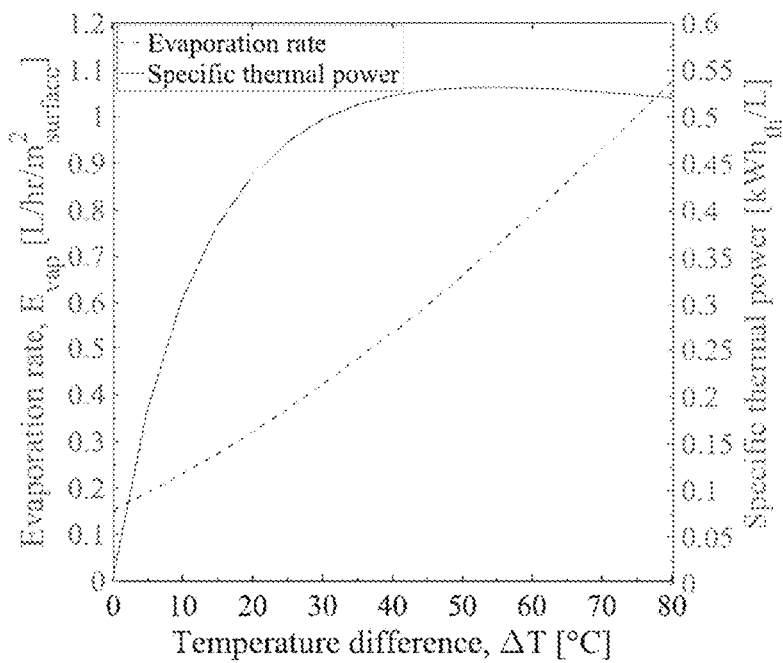
FIG. 5 illustrates evaporation rate and specific thermal consumption as a function of temperature difference between liquid and ambient, according to one example.

According to one aspect of the present subject matter, it was surprisingly found that there exists a threshold temperature difference between air and liquid after which heating the liquid can further enhance system evaporative performance without increasing system cost. FIG. 5 illustrates evaporation rate and specific thermal consumption as a function of temperature difference between liquid and ambient. As shown, increasing temperature difference increases evaporation rate. Also, increasing temperature difference increases the specific thermal power until a certain threshold is reached (at approximately 40 C) after which the specific thermal power become constant; thus, further heating above this threshold increases the evaporation rate at no additional cost.

According to one example, the present subject matter includes a method of operating a liquid evaporation apparatus having two operation modes.

In a first mode of operation, the system operates to evaporate liquid by air flow only. In the case when air flow is induced by means of a fan, the mode will consume electric energy only, so this is sometimes referred to as "all-electric mode"

In a second mode of operation, the system operates to evaporate liquid by a combination of air flow and heating of liquid. This mode is sometimes referred to as "heating mode". The "heating mode" entails operation at a temperature difference above the threshold value described elsewhere in this document. FIG. 1B illustrates a closer view of evaporation into the air stream passing over the liquid on a surface.

In one example, the "all-electric mode" provides a lower system cost and lower energy consumption, and higher footprint area. The "heating mode" provides a smaller, more compact, footprint area, and a higher cost.

The following depicts a schematic of a system, according to one example.

Figure 6:
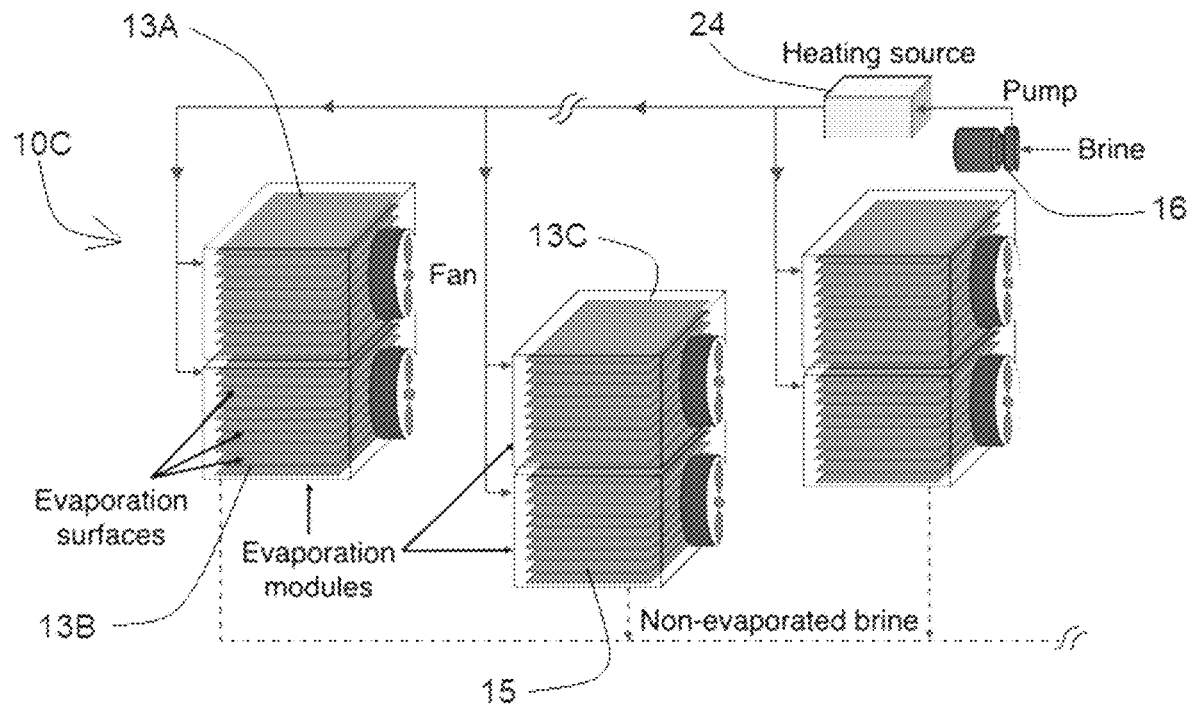
FIG. 6 illustrates a system having a number of evaporation modules, according to one example.

In the example illustrated in FIG. 6, a system includes any number of evaporation modules. A module can include a plurality of evaporation surfaces and a fan. The area of the evaporation surfaces can be increased to increase the evaporation capacity.

In FIG. 6, system 10C includes a plurality of modules, including modules 13A, 13B, and 13C, each of which include a plurality of evaporator surfaces, one example of which is marked evaporator 15. In addition, system 10C includes thermal unit 24, here depicted as a heating source. Thermal unit 24 can be affixed to the fluid line (or fluid distribution channel) as shown here coupled to pump 16. In other examples, thermal unit 24 can be affixed to an evaporation surface 15, or to a module such as modules 13A, 13B, or 13C. In the figure, non-evaporated brine is conveyed to a tank for recirculation and processing through pump 16.

Figure 7:
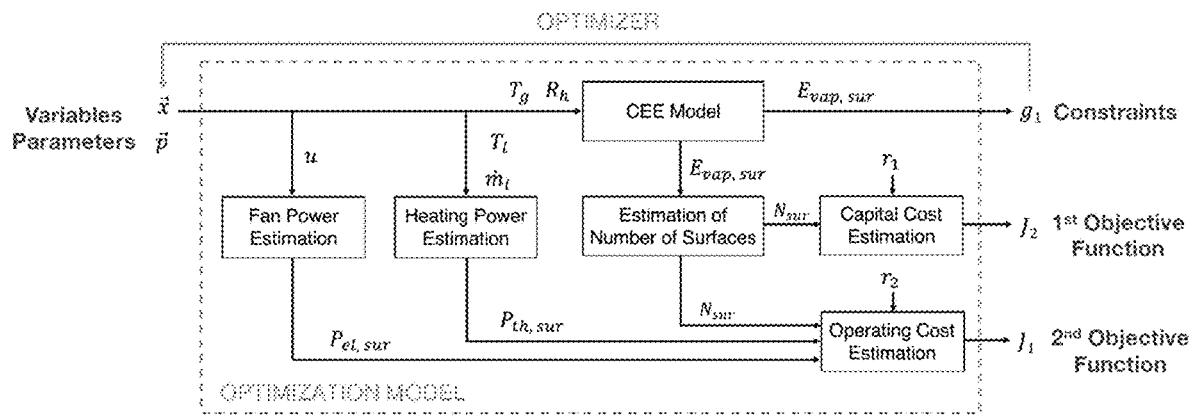
FIG. 7 illustrates optimization in the form of a block diagram, according to one example.

The following depicts an optimization block diagram, shown in FIG. 7.

Cost modeling for one example can be expressed as follows:

Capital cost estimation ($/m$^3$) is expressed as:

$$CC = k_m N_{surf} CR$$

where CRF is the capital recovery factor, $N_{surf}$ is the total number of evaporation surfaces in the system, and $k_m$ is the system material cost per evaporation surface ($/surface).

A normalized capital cost (($/m$^3$) per ($/kWh$_{el}$))) can be obtained by dividing the capital cost by the cost of electric energy as follows:

$$CC^* = \frac{CC}{k_{el}} = r_1 N_{surf} CRF$$

where $k_{el}$ is the electric energy unit cost ($/kWh$_{el}$), and $r_1$ is the material cost ratio defined in this example as the material cost per surface divided by the cost of electric energy:

$$r_1 = \frac{k_m}{k_{el}}$$

The operating cost ($/m³) expressed as:

$$OC = P_{el,sur} N_{sur} k_{el} \Delta t + P_{th,sur} N_{sur} k_{th} \Delta t$$

A normalized operating cost (($/m³) per ($/kWh$_{el}$))) can be calculated as:

$$OC^* = \frac{OC}{k_{el}} = (P_{el} + P_{th} r_2) N_{sur} \Delta t$$

where $r_2$ is energy cost ratio defined in this example as $$r_2 = \frac{k_{th}}{k_{el}}$$

Figure 8A:
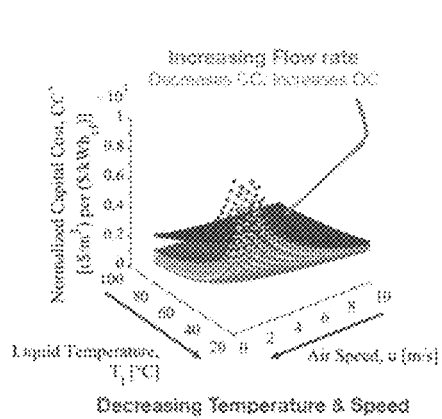
FIGS. 8A and 8B illustrate relationships between temperature, fluid flow rate and air speed, according to one example.
Figure 8B:
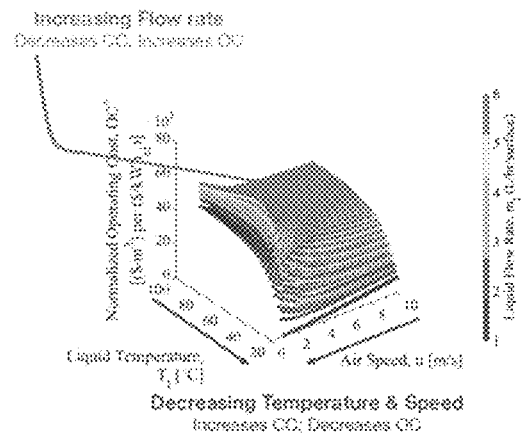

The case for optimization is set forth by the contradictory relationships noted in the charts shown in FIGS. 8A and 8B.

Figure 9A:
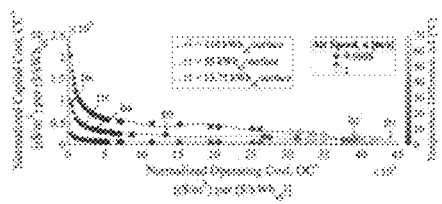
FIGS. 9A, B, C, and D illustrate Pareto fronts, according to various examples.
Figure 9B:
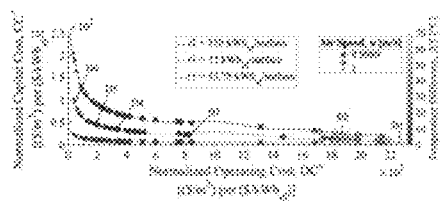
Figure 9C:
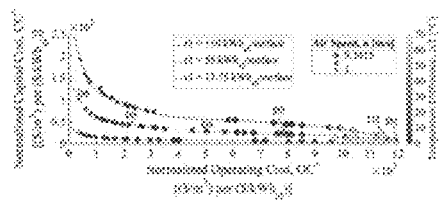
Figure 9D:
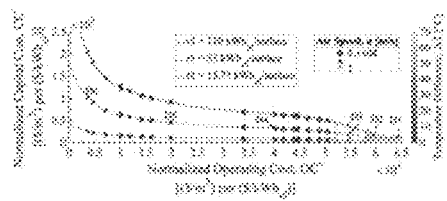

Expressed using Pareto fronts, a set of nondominated solutions can be depicted as illustrated in FIG. 9A having energy cost ratio $r_2$ as 1.0, FIG. 9B having energy cost ratio $r_2$ as 0.5, FIG. 9C having energy cost ratio $r_2$ as 0.25, and FIG. 9D having energy cost ratio $r_2$ as 0.125.

When viewed on a cost v. footprint area, the following are observed:

The operating cost is significantly greater than capital cost.

By way of summary, in an "all-electric mode" of operation, the following observations can be established in the example:
 a) Total cost=1.4-5 $/m³
 b) All $r_2$ values results in same total cost
 c) Not heating the fluids causes the evaporation rate per surface to decrease which requires more evaporation surfaces to achieve the target evaporation point.
 d) Highest capital cost; Lowest operating cost
 e) Highest footprint area (0.5 to 1.8 m²/m³)

In contrast to the "all-electric mode", operation in a "heating mode" in this example yields the following observations:
 a) Total cost>5 $/m³
 b) Heating the fluid increases the evaporation rate per surface leading to lower number of evaporation surfaces in the system which lowers the CC and lowers the footprint area as well.
 c) Lower footprint area (0.072-0.5 m²/m³)

This data suggests a compromise between total cost and footprint area. The following depicts performance for selected system configurations:

Conclusions can be reached concerning the two operational modes—that is, "all-electric" and "heating modes".
 a) "All-electric mode" corresponds to lower total cost with higher footprint area.
 b) "Heating mode" corresponds to a higher total cost with a compact system size of footprint area For small industries and plants limited by the available space, preheating the brine is a viable option (when energy cost ratio, $r_2$, is low)
 a) Reduce the footprint area (compact design)
 b) This has a trade-off on increasing the total cost by a ratio dependent on the cost of the available thermal energy The operating cost dominates the capital cost of CEE. This counsels in favor of giving more importance to the trade-off between the total cost and the footprint area.

Another aspect of the optimization method presented here is the use of normalized costs as a function of "material cost ratio" and "energy cost ratio" which allows to account for various scenarios of electric energy including but not limited to on-grid electricity, photovoltaic (PV) panels, diesel generators, and various scenarios of thermal energy including but not limited to solar-thermal, waste heat, natural gas burning. The optimization results obtained in this method are generalized results for different scenarios and locations.

Technical aspects of the method described herein include the capability of reliable operation and compromise between the cost and energy consumption and the footprint area, thereby the disclosed operation method makes the apparatus modular and suitable for on-site wastewater treatment, and for industries of different size scales.

One example includes a convection-enhanced evaporation device having a parallel flow configuration between air and liquid.

In addition to a convection-enhanced evaporation system, an example of the present subject matter can include an evaporation system not strictly limited to a convection-enhanced evaporation system.

In one example, a non-transitory computer-readable medium stores computer-executable instructions. The instructions, when executed by a computer, are configured to cause the computer to perform a method including selecting a fluid flow rate, wherein the fluid is configured to flow atop an evaporation surface and flow into a reservoir. The method includes selecting an air flow rate, wherein the air flow is configured to pass atop the fluid on the evaporation surface and vent to atmosphere or into other units. The method includes selecting a temperature for a thermal element, wherein the thermal element is configured to temper the air flow, the fluid, or the tray.

In one example, the method includes the following:
 a) receiving values of at least some ambient weather parameters;
 b) determining combinations of operating conditions that would produce a specified evaporation;
 c) identifying a combination meeting a cost target, an energy target, or both a cost and energy target;
 d) adjusting one or more control settings; and
 e) predicting performance for the new set of parameters based on new values.

In one example, the system includes a controller configured to access historical weather data or real time data. The weather data or real time data allows tailoring of the operational configuration.

In one example, the liquid temperature and flow rate, and air flow speed are regulated, or controlled by a processor, to enhance the driving force for evaporation to reduce the cost and/or energy consumption and/or footprint area of the apparatus.

One example includes accessing stored data corresponding to the nominal weather conditions based on historical data for a specific location and adjusting operational parameters accordingly.

One example includes accessing stored data corresponding to thermal to electric energy cost ratio based on local electricity rates (sources can include but not limited to PV, wind turbines, diesel generator) and the availability of thermal energy from sources including but not limited to solar, waste heat, natural gas, electric heating.

One example includes accessing the material cost ratio based on local suppliers and market.

One example includes identifying a set of operating conditions (liquid and air flow rate, liquid temperature) based on an available or desired footprint area and desired cost and/or energy consumption.

Some of the results presented herein are applicable to selected scenarios, such as different electric energy costs, thermal energy sources, and different material costs, and not limited to specific conditions.

Technical aspects of the method described herein include the capability of reliable operation and compromise between the cost and energy consumption and the footprint area, thereby the disclosed operation method makes the apparatus modular and suitable for on-site wastewater treatment, and for industries of different size scales.

Figure 10:
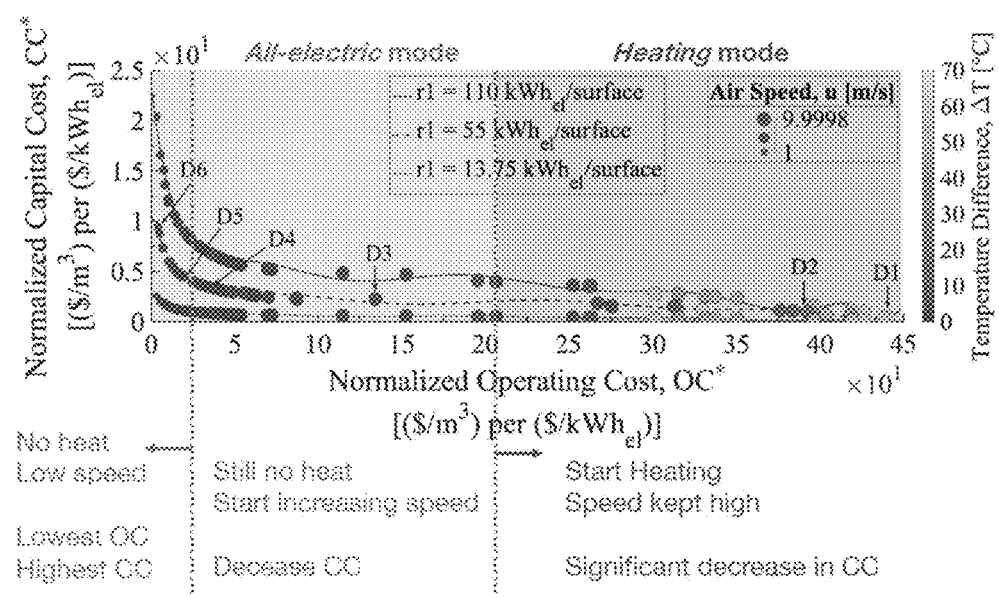
FIG. 10 illustrates relationships between operating costs and energy ratios, according to various examples.

FIG. 10 depicts operating cost relative to normalized capital costs and relative to temperature difference, assuming energy cost ratio $r_2$ is 1.0 in both an all-electric mode and in a heating mode.

Figure 11:
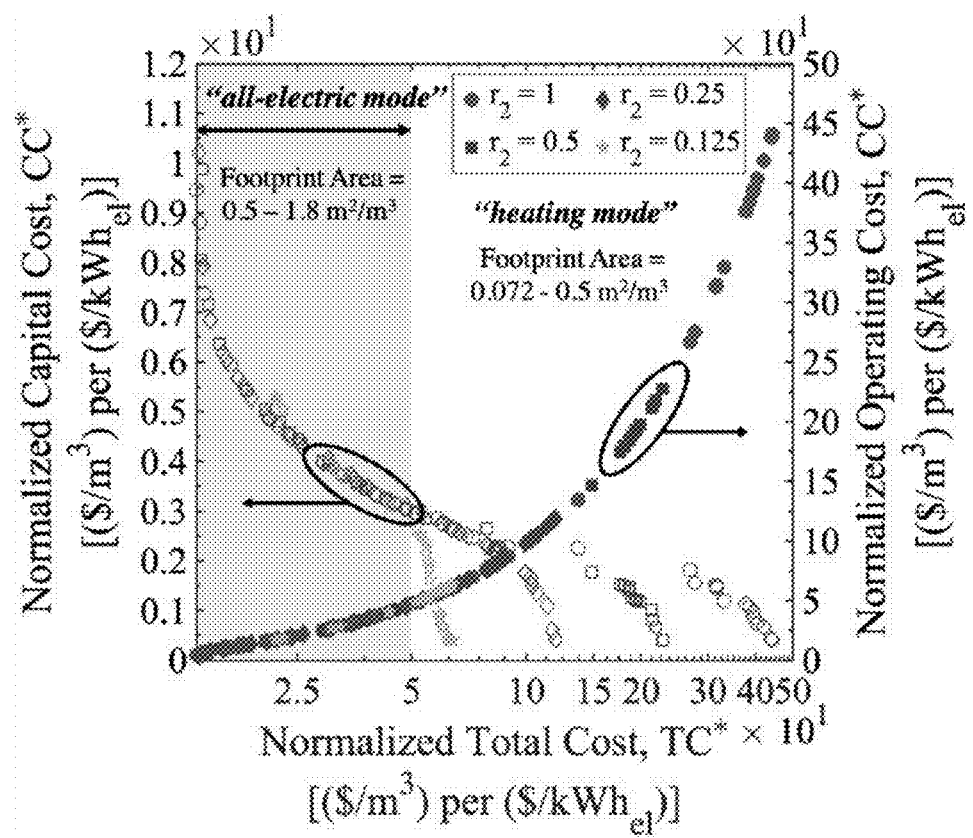
FIG. 11 illustrates relationships between operating costs and capital costs, according to various examples.

FIG. 11 depicts normalized total cost relative to normalized capital cost and relative to normalized operating cost. An all-electric and heating mode are shown.

Figure 12A:
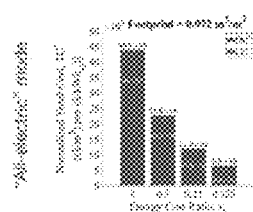
FIGS. 12A-12F illustrates relationships between performance and system configuration, according to various examples.
Figure 12B:
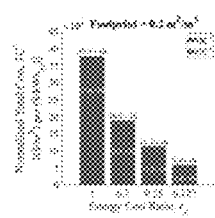
Figure 12D:
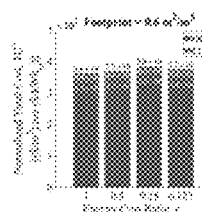
Figure 12C:
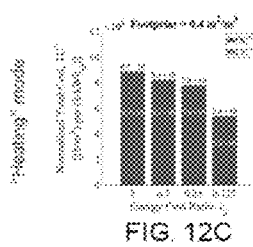
Figure 12E:
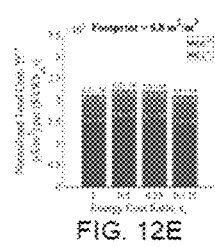
Figure 12F:
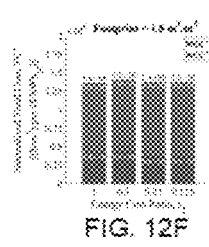

FIGS. 12A-F depict energy cost ratio $r_2$ as a function of normalized total cost for various footprint ratios. FIG. 12A shows a footprint ratio of 0.072 $m^2/m^3$, FIG. 12B shows a footprint ratio of 0.2 $m^2/m^3$, FIG. 12C shows a footprint ratio of 0.4 $m^2/m^3$, FIG. 12D shows a footprint ratio of 0.6 $m^2/m^3$, FIG. 12E shows a footprint ratio of 0.8 $m^2/m^3$, and FIG. 12F shows a footprint ratio of 1.8 $m^2/m^3$.

Figure 13:
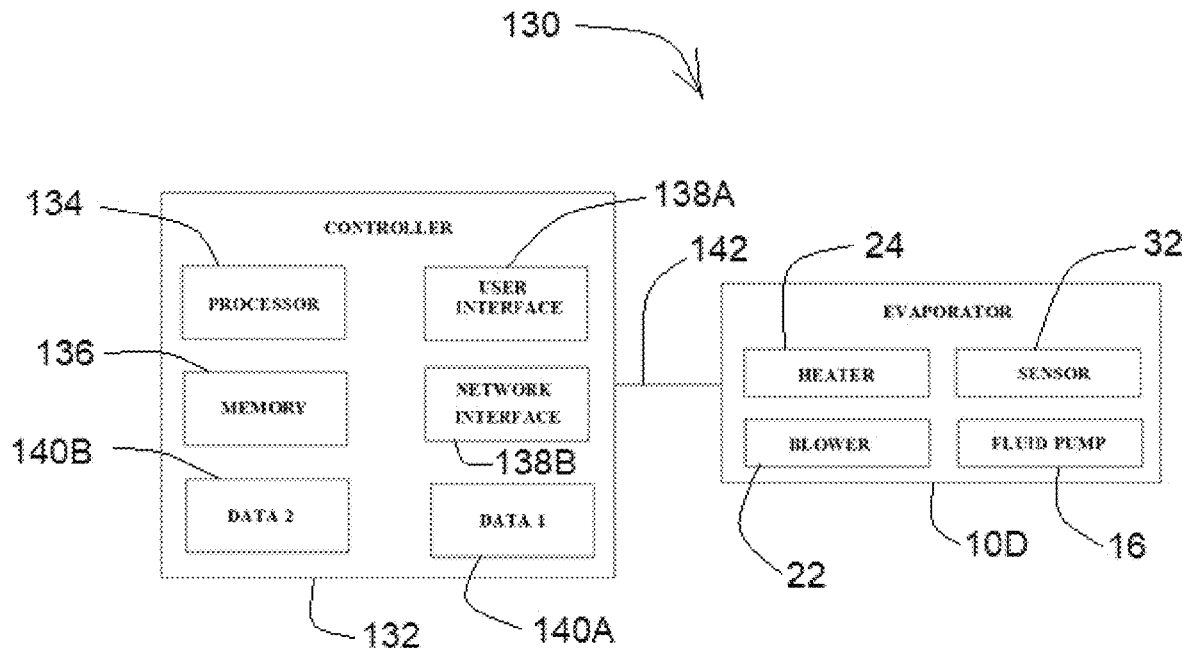
FIG. 13 illustrates a schematic of the present subject matter in which a controller is coupled to an evaporator, according to one example.

FIG. 13 illustrates a schematic of one example of the present subject matter in which a controller is coupled to an evaporator. In the figure, system 130 includes controller 132 and evaporator 10D coupled by link 142. Link 142 can includes a wired or wireless coupling on which is carried sensor signals, instructions, command signals, or other communications. Controller 132 includes processor 134 which can include an analog or digital processor or computer. Controller 132 includes memory 136 having instructions and data stored therein. Controller 132 includes an interface, here depicted as user interface 138A and network interface 138B. User interface 138A can include a keyboard, a mouse, a touchpad, a display, a printer, a microphone, a speaker, or any other type of user-operable or user-perceivable element. Network interface 138B can be coupled to a data or communication network such as an internet, a local network, a wide area network and can include interface hardware including a gateway or a router and include a wired connection or a wireless connection. Data 140A and data 140B can include storage for instructions and memory and in one example, includes storage for current weather conditions and forecast weather.

Evaporator 10D can include thermal element 24 (here depicted as a heater), a fan, here depicted as fan 22, and fluid pump 16. In addition, evaporator 10D includes sensor 32. Sensor 32 can include a temperature sensor, a fluid level sensor, a fluid flow sensor, an air flow sensor, a humidity sensor, an air pressure sensor, a strain gauge, or other sensor.

In one example, the evaporator includes a plurality of evaporator trays in stacked vertical alignment. Other arrangements of trays are also contemplated, including those described elsewhere in this document. On each tray, a liquid is distributed in a thin film and delivered at a rate determined by fluid handling equipment. In the figure, the fluid flow rate is determined by a module represented as a fluid pump. Air is moved over an upper surface of the tray with liquid at an air flow rate determined by a module represented here as a blower. The air, after having passed over the liquid on the tray, is vented to outside the evaporator. A heater module is provided and is needed when operating in the "heating-mode" which is discussed elsewhere in this document. The heater can be coupled to an evaporation tray, a fluid conduit, a blower module, or other structure of the evaporator. The heater can be powered by an electric current or by non-electric power source, such as a fuel burner, a solid heating fuel, geothermal source, solar-thermal source, or other means. A sensor of the evaporator can provide an output signal corresponding to a fluid flow rate, an evaporation rate, a fan speed (of the blower), a mass detector, a particle detector, or other sensor.

In the example illustrated, the controller, in communication with the evaporator, includes a processor, a memory, data 1, data 2, a user interface, and a network interface. Additional modules can also be provided, such as an output module to provide wired or wireless communication with a remote device (such as a remote controller or an evaporator, or an additional control module). The processor can include an analog or digital signal processor configured to implement an algorithm described elsewhere in this document. The memory module can include stored instructions or stored data for use by the processor. The user interface can include a printer, a keyboard, a touchpad, a display, a microphone, a speaker, or other hardware. The network interface can include a wired or wireless telemetry module to allow communication with the internet or a local network. Data 1 and data 2 can include additional data sources. For example, sensor data from the evaporator can be received on one channel and a signal corresponding to ambient conditions can be received on a second channel.

The following describes a method for operating a system according to one example.

Figure 14:
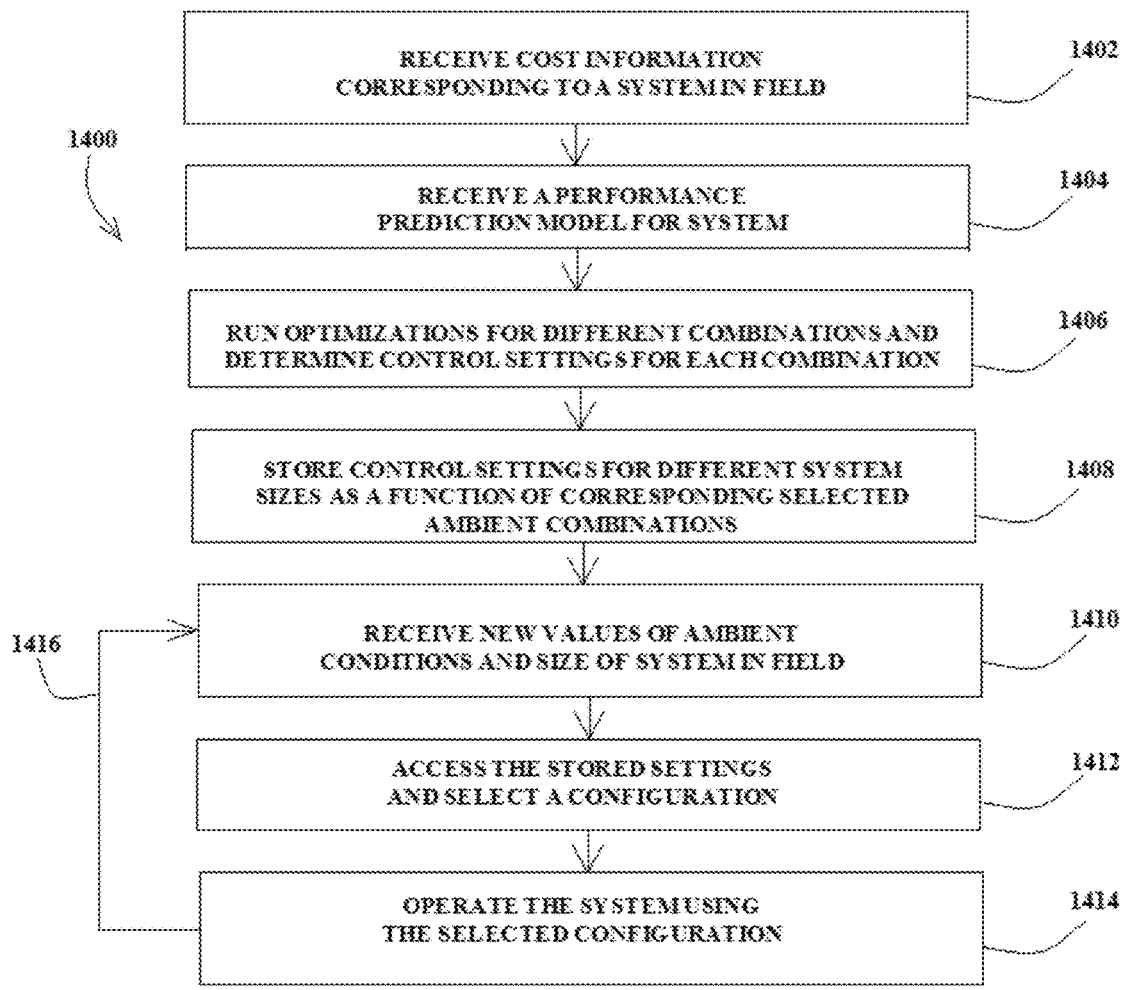
FIG. 14 illustrates an optimization method, according to one example.

The method here describes a control system for, among other things, selecting an operational parameter. In one example, the system is operated at an optimized configuration. The optimized operation method described herein is a data-driven method to continuously update the operation settings of the system. The dataset and the control function can be implemented in a variety of programming languages allowing for variety of control hardware options. See FIG. 14.

At 1402, method 1400 includes receiving cost information corresponding to a system in the field. The cost information can include material and energy cost ratios which were discussed elsewhere in this document. The energy costs can include thermal cost and electric cost information. In one example, this can include normalizing the costs. Normalizing the costs allows for accounting for different sources and costs of thermal energy (solar, waste heat, natural gas, electric heating, etc.) and electric energy (grid electricity, PV, wind turbines, diesel generators, etc.), and different costs and options for system fabrication material depending on the market and place (country).

At 1404, method 1400 includes receiving a performance prediction model for the system. The model can reflect parameters such as evaporation rate, energy consumption, and cost. A performance prediction model can include a mathematical model that can simulate a system.

At 1406, method 1400 includes running optimizations for different combinations and determining control settings for each combination. The different combinations can correlate with differing ambient conditions, such as temperature and humidity. Determining control settings can include determining optimal control settings, such as liquid flow rate, air flow rate, and temperature, for each combination.

Notice that, after normalizing the costs and creating material and energy cost ratios as explained in 1402, the only remaining variables/inputs in the optimization are ambient conditions (temperature and humidity). Next, run a set of optimizations for different combinations of ambient conditions. Note that this is only doable after the cost normalization step which allowed for running the generalized simulations.

At 1408, method 1400 includes storing control settings for different system sizes as a function of corresponding selected ambient conditions. The control settings can be selected for optimum performance.

At 1410, method 1400 includes receiving new values of ambient conditions and size of system in the field. The new values can reflect real time data or historic data or forecast data which are received in a timely manner during system operation.

At 1412, method 1400 includes accessing the stored control settings and selecting a configuration. The selected control settings can correspond to the closest value to the new values of ambient conditions and system size.

At 1414, method 1400 includes operating the system using the accessed values of control settings.

At 1416, method 1400 returns processing to continue receiving new values of ambient conditions and updating the system operating control settings.

Dataset preparation (or optimization method) can be viewed as elements 1402, 1404, 1406, and 1408. Control strategy can be viewed as elements 1410, 1412, and 1414. The optimization algorithm will be performed, and the results (optimal control settings) are stored in memory. Thereafter, the controller implemented in the field will access the data stored in memory.

Controller: Case Study

Figure 15A:
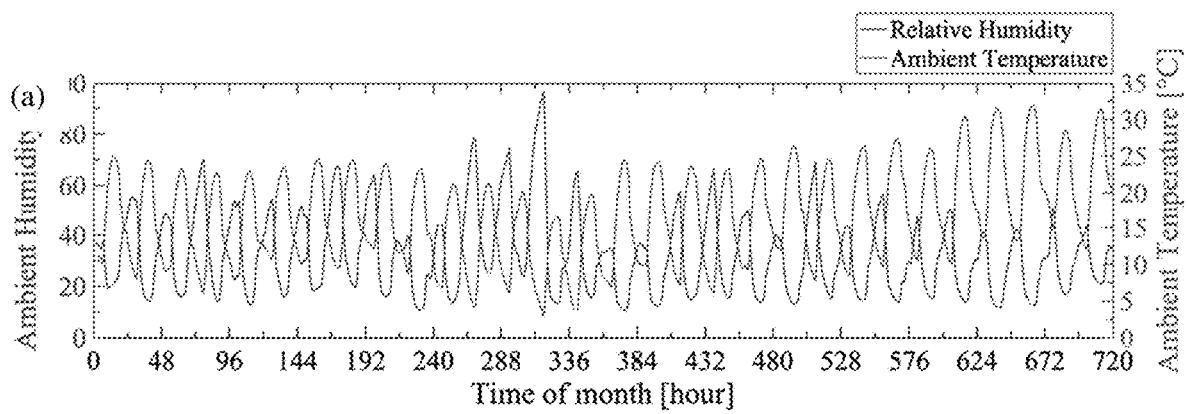
FIGS. 15A, B, and C illustrate performance data, according to one example.
Figure 15B:
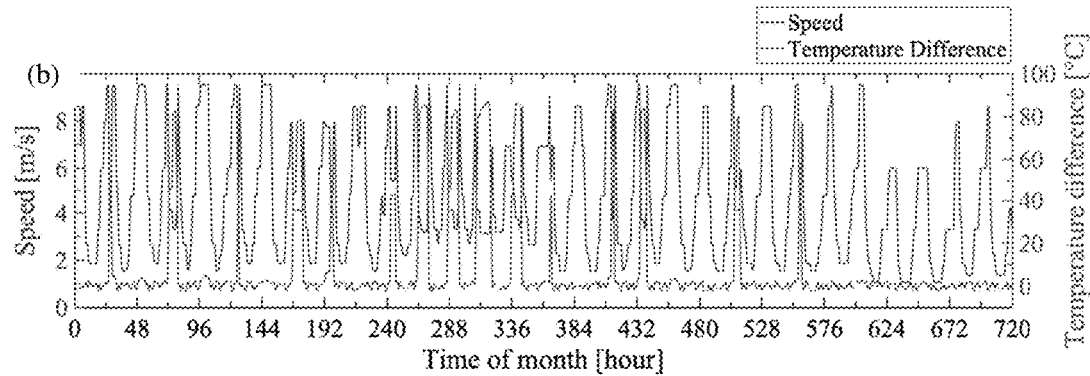
Figure 15C:
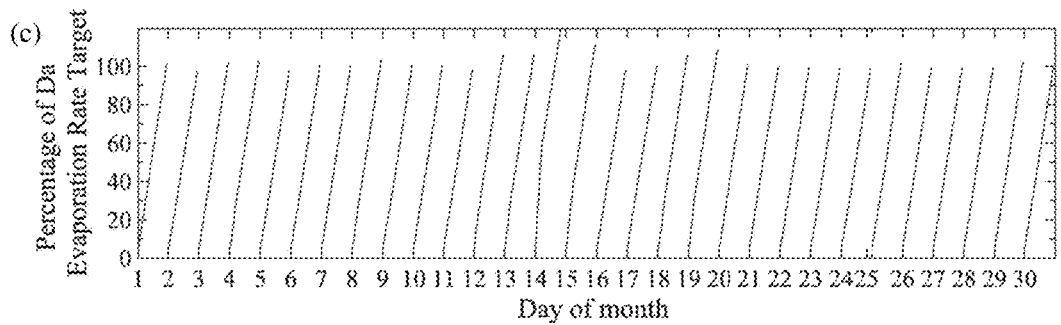

This data in FIG. 15 represents a case study of applying the controller to optimize the hourly operation of a selected system over a duration of a month. FIG. 15A shows the ambient temperature and humidity (historic data); FIG. 15B shows the optimal operating conditions (temperature and air speed) outputted by the controller; FIG. 15C shows the daily evaporation rate relative to daily evaporation target. The controller is fast and can read real time ambient conditions and update the operating conditions accordingly.

In FIG. 15B, temperature difference curve (blue curve) shows that the controller is switching between the two operating modes: "all-electric mode" and "heating mode". Also, it is noticed that in "heating mode", the controller selects high temperature directly which agrees with the previously presented conclusions in FIG. 12 which claims that after a certain temperature difference threshold, an increase in temperature difference improves heating performance of the system at no additional cost.

FIG. 15C shows that the controller can maintain achieving the daily target evaporation point.

In one example, a data-driven optimal control method is implanted to reduce the operating cost of a Convection-Enhanced Evaporation (CEE) system under time-varying weather conditions. CEE refers to an approach of evaporating saline films (brine) from packed wetted evaporation surfaces by air convection, and actively controlling the operation variables. The controller modulates the operation of the CEE system in a time-dependent fashion based on a dataset including Pareto fronts obtained from solving an optimization problem at different combinations of ambient temperature and humidity.

Three optimal operation strategies can be considered: (1) variable operating conditions, (2) scheduled time of operation, and (3) hybrid wind-fan operation. In a scheduled time-varying operation, cost savings are substantial and allow the system to shut down during periods of high operating cost and optimize the operating variables during other periods. A control strategy allows a CEE system adjust operation under various weather conditions and operation scenarios.

Desalination and industrial plants (e.g., energy and oil production) generate significant amounts of saline wastewater known as brine. Brine management is increasingly becoming an environmental and financial challenge due to its adverse impacts on the environment and the high costs associated with its treatment. Commonly studied brine treatment technologies, such as brine crystallizer, are costly and energy intensive especially at small volume applications.

Technologies for managing brine at small scale include membrane distillation (MD) and forward osmosis (FO), and evaporative technologies including humidification-dehumidification (HDH) systems.

Convection-enhanced evaporation (CEE) is an evaporative brine concentration technology which utilizes air convection to evaporate saline liquid films flowing over evaporation surfaces. A CEE system includes a set of packed hydrophilic evaporation surfaces and liquid is sprayed along the width of each evaporation surface forming thin films. A fan mounted at one end of a unit forces air flow over the films, which creates a difference in vapor pressure between the air and the liquid inducing evaporation. Primary variables affecting the performance and operating cost are: (1) liquid temperature, (2) liquid flow rate, (3) air speed. An example of the present subject matter includes receiving static ambient information and outputs the cost-optimal operating variables.

As a result of daily and seasonal variation in ambient conditions, a system can deviate from optimal operation status.

To compensate, active control of the operating variables allows optimizing the performance based on time-varying ambient conditions to minimize or reduce the operating (energy) cost subject to a desired daily evaporation rate.

A conventional controller (such as proportional-integral-derivative or PID) can control the operation of desalination processes. In addition, non-linear model-based controls and optimization-based control can be used to maintain output at a setpoint value but are unable to optimize energy consumption or operating cost under ambient conditions.

Some approaches require running the optimization in real-time which demands that the frequency of solving the optimization problem is comparable to the frequency of the real-time variation of ambient conditions, which limits the optimization problem to simple and quickly converging ones.

One example of the present subject matter includes a data-driven optimal control method to reduce operating cost based on time-varying weather conditions. According to one example, the present subject matter is configured to (1) optimize the operating variables (liquid flow rate, liquid temperature, fan speed) of a CEE system as a function of ambient conditions variations (temperature, humidity, wind speed), and (2) determine the optimal operation schedule allowing the system to shut down at periods requiring high operating cost (energy cost), and to operate either fully or partially during other periods.

In one example, the objective function of the optimization problem is minimal operation (energy) cost subject to achieving the design desired evaporation rate per day. In one example, the system uses a hybrid wind-fan operation to reduce the electric energy consumption of the fan.

EXAMPLE

The control method is configured to achieve the desired target evaporation rate under time-varying ambient conditions, while maintaining minimal operating costs (energy cost).

According to one example, a method includes transforming a control problem into an optimization one. Target evaporation rate (controller setpoint) is considered as an optimization constraint, and the cost is treated as an objective function to be minimized. Due to the high computational cost for solving the optimization problem in real time, a data-driven approach is described.

Data Driven Control

This section presents a data-driven optimization-based control method for CEE operation taking into consideration the time-varying profile of ambient conditions.

Figure 16A:
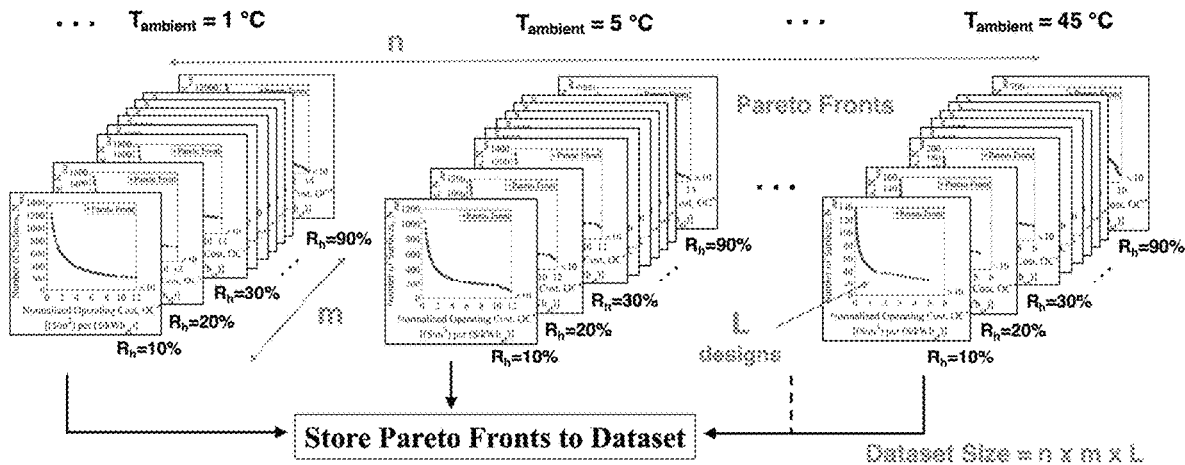
FIGS. 16A and 16B illustrate methods, according to one example.

The method can be construed as data generation (see FIG. 16A), in which a dataset of cost-optimal operating variables is generated, and a control strategy (see FIG. 16B), in which the controller receives weather conditions during each time interval and optimize the operating variables of CEE accordingly.

The data generation phase includes:

a) Receiving performance prediction model that can simulate the performance of CEE based on operating and ambient conditions. The prediction model can be derived from a physics-based model.

b) using the model to compute the optimization objective function (cost) and constraints.

c) determining a set of optimization problems for different combinations of weather conditions (ambient temperature and humidity), and obtain Pareto fronts of cost optimal operation. Each Pareto front includes the optimal operating variables at distinct system sizes.

d) storing the cost-optimal control variables (liquid flow rate, liquid temperature, air flow speed) in a database as a function of distinct system sizes (i.e., store the Pareto fronts).

Figure 16B:
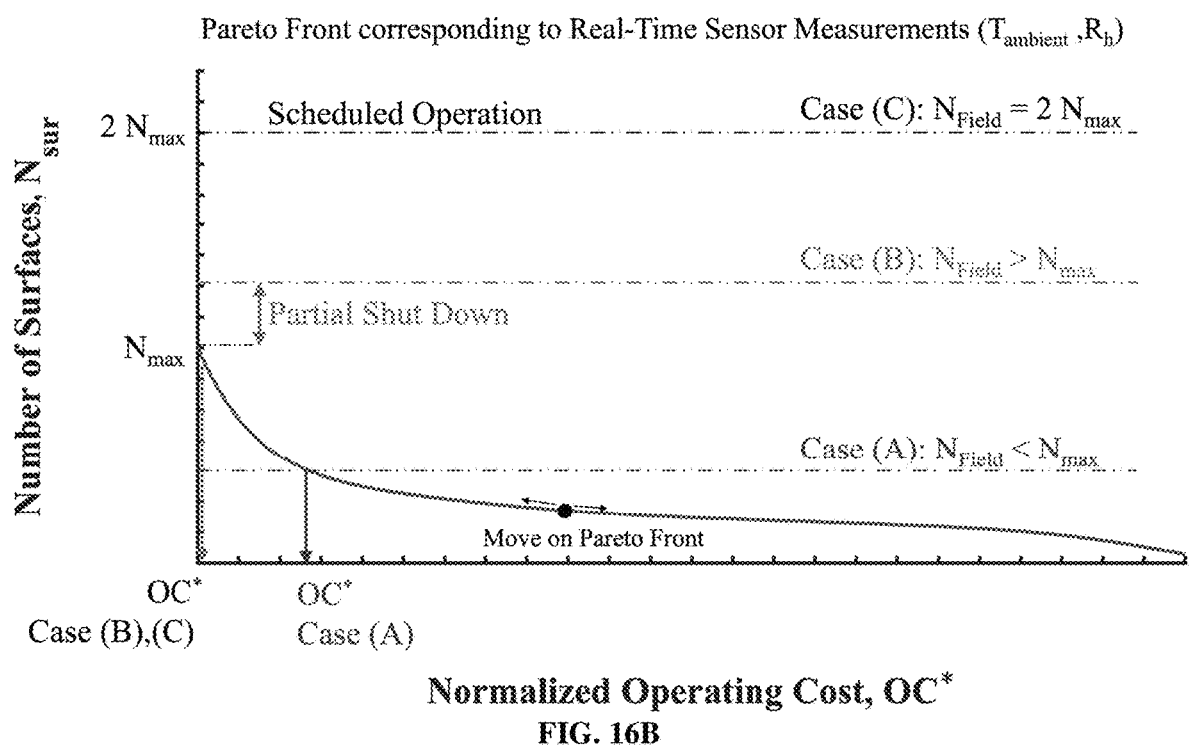

After the dataset is generated, it is implemented in the controller memory. FIG. 16B shows an example of a control strategy. Consider a CEE system operating in the field and having a number of surfaces of $N_{Field}$. At the outset of each time interval, the controller receives the sensor reading of real-time ambient temperature and humidity, and it selects the Pareto front corresponding to the closest conditions. Each Pareto front represents a compromise between operating cost and number of surfaces (that is, system size) where the maximum number of surfaces is defined as $N_{max}$. Smaller sizes results in higher operating cost. Each point on the Pareto front represents a vector of optimal design variables (liquid flow rate, liquid temperature, air speed) at a corresponding cost and system size. The controller will move the design point along the Pareto front to select the system size that minimizes the cost limited by $N_{Field}$. Based on this, three cases can exist:

Case A: $N_{Field} < N_{max}$

In this case, the controller will move the design point to the left portion of the Pareto front to take advantage of all the evaporator surfaces available in the field resulting in a minimal operating cost.

Case B: $N_{Field} > N_{max}$ (Partial Shut-Down)

In this case, there are additional evaporator surfaces available in the field. The controller will operate the system at number of surfaces equals $N_{max}$ corresponding to the minimal operating cost, and powers off the additional surfaces (modules). This is called partial shut-down.

Case C: $N_{Field} = \alpha N_{max}$ (Scheduled Operation)

In this case the number of evaporator surfaces available in the field is significantly greater than $N_{max}$ by a factor $\alpha$. Assume $\alpha$ is 2, then the evaporation rate during that time interval can be duplicated by activating all surfaces. This strategy is an advantage allowing the controller to completely power off the system during periods having high operating cost and operate during other periods. This strategy is called scheduled operation.

Figure 17A:
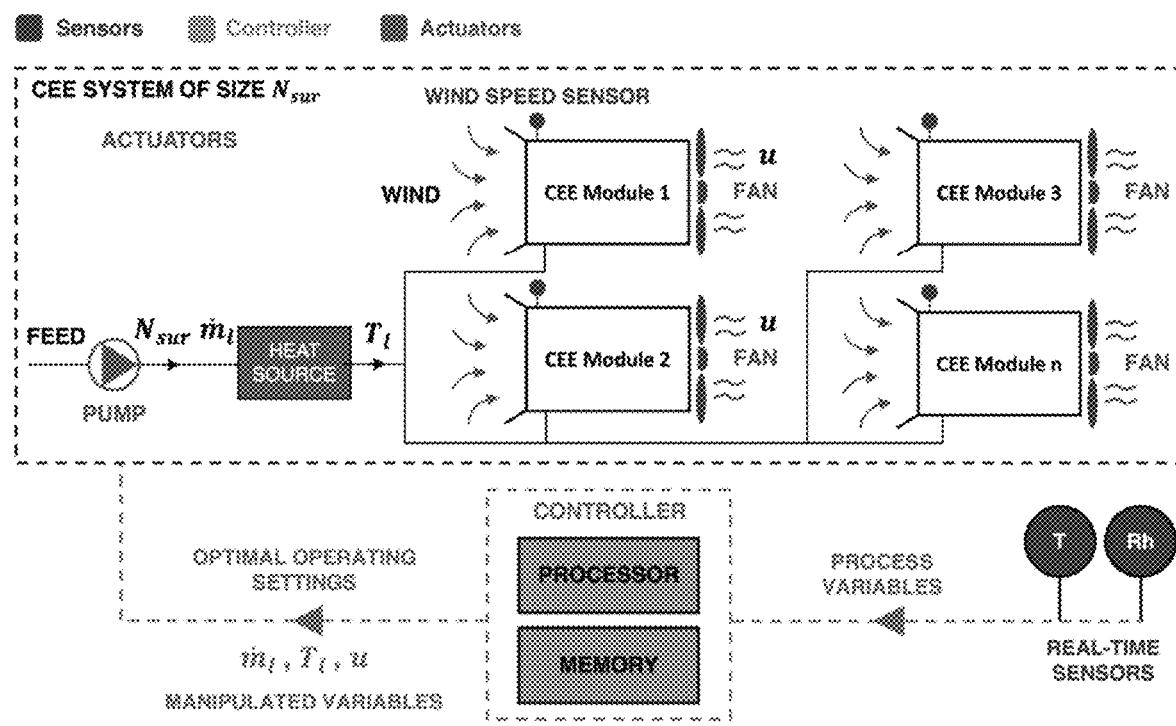
FIGS. 17A and 17B illustrate schematics of systems according to various examples.
Figure 17B:
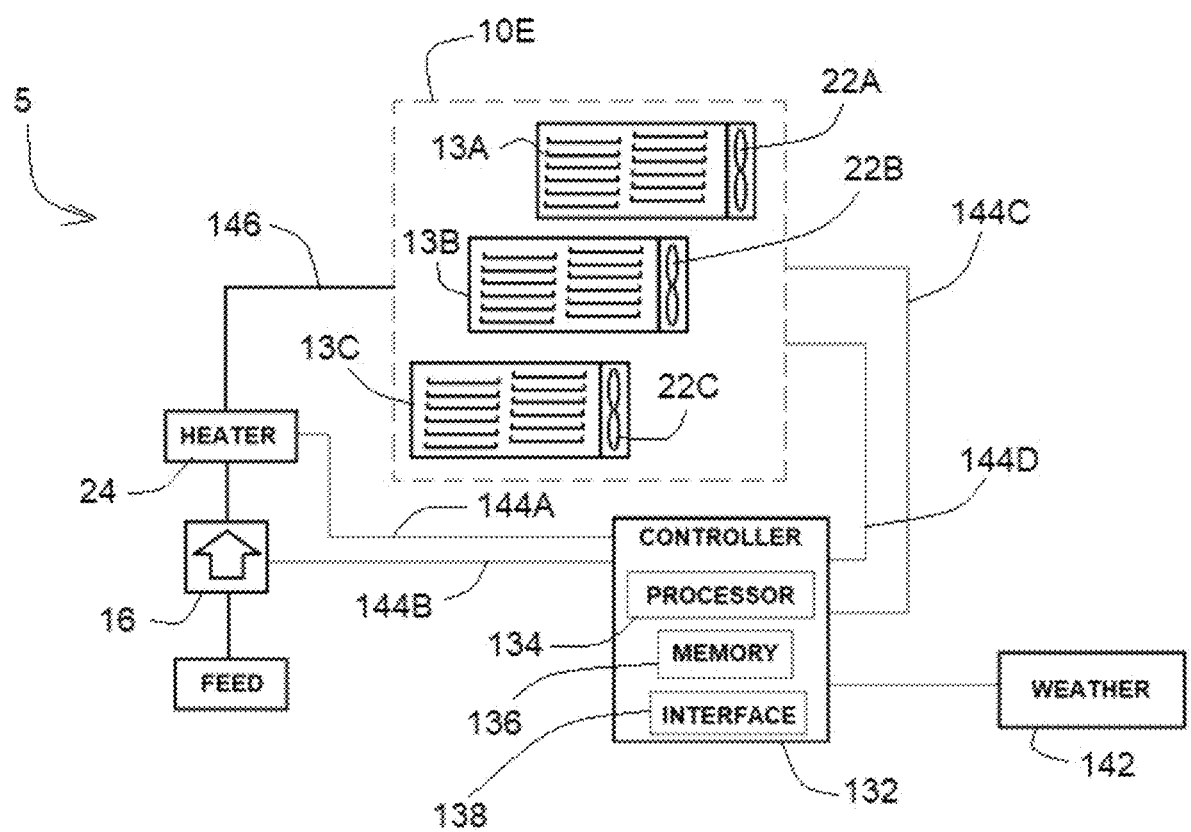

FIGS. 17A and 17B show the data flow between the measurement sensors, controller, and CEE system actuators (pump, heating source, fans). The controller continuously receives the sensors reading of ambient conditions (temperature and humidity) as process variables and outputs the optimal operating variables (liquid flow rate, liquid temperature, and air speed) to CEE actuators. This control method allows the CEE system to adjust operation under various weather conditions and operation scenarios.

FIG. 17B depicts system 5 having evaporator 10E and controller 132 as well as other elements. Evaporator 10E includes module 13A coupled to fan 22A, module 13B coupled to fan 22B, and module 13C coupled to fan 22C. In the example shown, modules 13A, 13B, and 13C each include two stacks of evaporator surfaces and via a control signal provide on line 144C, for example, modules can be powered on, powered off, or otherwise modulated in a manner which draws more or less power or other resources (such as fluid flow).

Evaporator 10E is coupled by line 144C as well as 144D, either or both of which include data lines or instruction, or signal lines to sense or monitor performance or mode, and control lines.

Heater 24 can be coupled to fluid line 146 as shown in the figure, or coupled to other elements of evaporator 10E. Heater 24 is coupled to controller 132 by a sensor line or by a control line 144A.

Pump 16 conveys fluid to evaporator 10E from a feed supply (which can include fluid intake as well as recirculated fluid). Pump 16 is coupled to controller 132 by line 144B which can carry instructions, signals, or data.

Controller 132 is coupled to a source of weather data at weather 142. Weather 142 can includes current weather data as well as forecast data. Weather 142 can be derived from a local sensor or from a remote weather service provider.

Cost Model

The costs are normalized by the electric energy unit cost, $K_{el}$. The normalized capital cost of CEE can be estimated as $$CC^* = r_1 N_{sur} CRF, \tag{1}$$

where $r_1$ is the material cost ratio defined as $$r_1 = K_m / K_{el} \tag{2}$$

and $K_m$ is the system material cost per evaporation surface, $N_{sur}$ is the total number of evaporation surfaces, and CRF is the capital recovery factor.

The normalized operating cost of CEE is expressed as $$OC^* = (P_{el,sur} + P_{th,sur} r_2) N sur \Delta t, \tag{3}$$

where $r_2$ is the energy cost ratio defined as $$r_2 = K_{th} / K_{el}. \tag{4}$$

and $P_{el,sur}$ and $P_{th,sur}$ are the electric and thermal power consumption per surface respectively, $K_{th}$ is the cost of thermal energy unit, and $\Delta t$ is the operation time duration in hours.

Cost normalization generalizes the formulation of the capital cost to distinct material costs depending on the market and other economic factors, and generalizes the formulation of operating cost to various sources and costs of thermal energy (solar, waste heat, natural gas, electric heating, etc.) and electric energy (grid, PV, diesel generators, etc.). The remaining factors affecting the optimization process are the ambient conditions (temperature and humidity). The normalized costs (OC*) can be multiplied by the electric energy unit cost, $K_{el}$, to obtain the cost in \$/m$^3$ (an example value for $K_{el}$ is \$0.1/kWh$_{el}$).

The total number of surfaces in the CEE system is estimated as $$N_{sur} = E_{vap,Target}/E_{vap,sur} \quad (5)$$

where $E_{vap,Target}$ is the target evaporation rate and $E_{vap,sur}$ is the evaporation rate per surface. $E_{vap,sur}$ is affected by the ambient conditions making the cost model a function of ambient conditions.

The evaporation rate, electric and thermal energy use per surface are estimated from a mathematical model of CEE.

The model is a finite difference model based on the conservation equations of mass and energy which can simulate the simultaneous heat and mass transfer occurring in CEE under various design and operating variables.

Optimization Framework

The optimization problem minimizes objective function ($J_1$) operating cost consisting of the electric and thermal energy costs and ($J_2$) capital cost which is a function of the number of evaporation surfaces in the system in order to obtain data on optimal designs over a wide range of system sizes (number of modules) and footprint areas. The problem can be presented in the following general formulation:

$$\min_x J(x, p) \quad (6)$$
$$\text{s.t. } g(x, p) \le 0,$$

where x is the design vector to be optimized, p is the vector of constant model parameters, J(x) is the vector of objective functions ($J_1$ and $J_2$), and g(x) is the inequality constraint. The design vector is bounded from below and above by $x_{lb}$ and $x_{ub}$, respectively. The selected optimization algorithm is the multi-objective genetic algorithm implementation in MATLAB, gamultiobj, which uses a controlled elitist genetic algorithm (a variant of NSGA-II).

TABLE 1

| Variable | Symbol | Bounds | Unit |
| --- | --- | --- | --- |
| Brine flow rate | $\dot{m}_1$ | 1-6 | L/hr/surface |
| Brine inlet temperature | $T_1$ | $T_g$-90 | ° C. |
| Air speed | u | 1-10 | m/s |

Table 1 shows upper and lower bounds imposed on the decision variables.

Air speed, brine flow rate per evaporation surface and brine inlet temperature have a major influential effect on the evaporation performance and energy consumption. Therefore, these operating variables are considered as the manipulated variables by the controller and are set as the optimization variables represented by design vector x. The constant model parameters are assigned in parameter vector p. A subset of the optimization parameters of interest in this study are listed in Table 1.

The daily target evaporation rate is set as the inequality constraint in g=[g1]≤0 to be imposed is $$g_1 = E_{vap,Target} - E_{vap,sur} N_{sur}. \quad (7)$$

where $E_{vap,sur}$ is the achieved evaporation rate per evaporation surface, and $N_{sur}$ is the total number of surfaces in the system.

Dataset Generation

The dataset includes the optimal operating variables at different combinations of ambient conditions and system sizes. In one example, the dataset covers a wide range of weather conditions including 14 values of ambient temperature (ranging from −20° C. to 45° C. with 5° C. increment) and 10 values of relative humidity (ranging from 10% to 90% with 10% increment in addition to 85%), resulting in combinations of 140 optimizations. For each combination of ambient temperature and humidity, the obtained Pareto front from the optimization enables to compose an array of the optimal operating variables (liquid flow rate, liquid temperature, and air speed) at 150 different system size resulting in 21'000 design arrays which are saved and compose the dataset. The dataset, in one example, was established for material and energy cost ratios of $r_1$=55 kWh$_{el}$/surface and $r_2$=0.25, respectively, and it can be expanded to include other ratios.

Scheduled Operation

Figure 18:
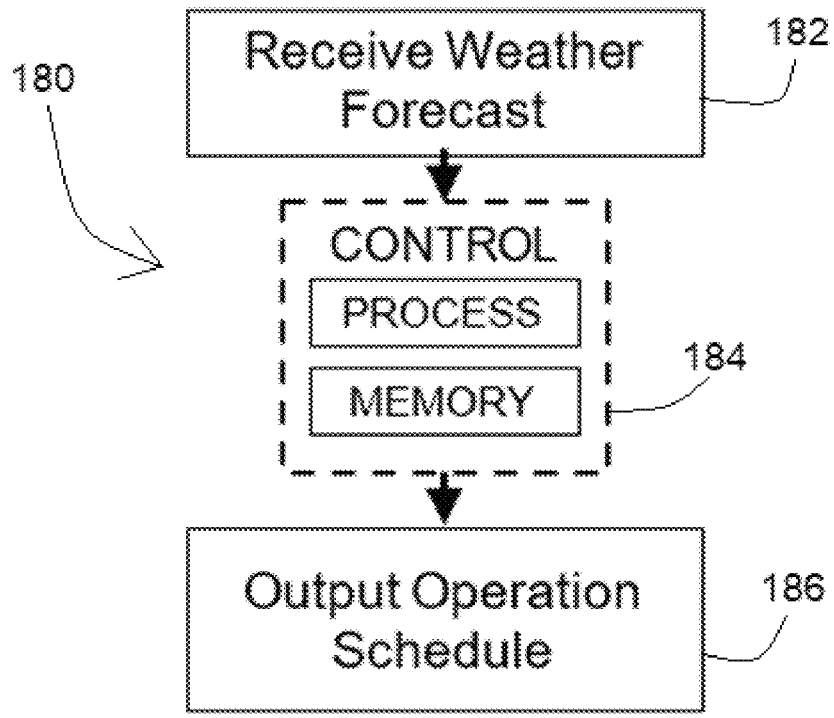
FIG. 18 illustrates a method of generating an operation schedule, according to one example.

In addition to actively optimizing the operating variables, the controller aims to find the optimal operation schedule which allows the system to shut down at periods requiring high energy consumption, and to operate either fully or partially during other periods to achieve minimal operation (energy) cost subject to achieving the design desired evaporation rate per day. According to one example, the generation of optimal operation schedule includes method 180, an example of which is shown in FIG. 18.

As shown, method 180, at 180, includes receiving weather data. In one example, this includes receiving forecast weather information concerning parameters such as temperature or relative humidity. At 184, method 180 includes executing a process to determine operational parameters for an evaporator. In the example shown, this includes accessing memory and performing an algorithm using a processor to determine subsequent operational parameters.

At 186, method 180 includes determining an output operational schedule. The schedule can include a specified duty cycle for powering on and powering off selected components of a system. For example, a fluid pump can be cycled on and off to control fluid flow. In another example, a valve can be modulated between a fully open mode and a fully closed mode in order to regulate fluid flow. A fan can be regulated between a powered on and powered off mode to control air speed through an evaporator.

Other configurations are also contemplated. For example, the system can receive weather forecast for a subsequent time period and execute a program to determine a schedule. The programming can include a routine to estimate an operating cost in each time interval (such as hourly). In addition, the programing can include identifying time intervals having a lowest cost or highest cost and based on this information, the schedule for operating an evaporator system can be established.

The following sets forth an example of a routine.

1. Controller receives weather forecast (ambient temperature and humidity) for a selected period (such as the next 24 hours).

2. Simulate the system based on the received weather prediction and output the corresponding hourly operating cost.

3. Generate an optimal operation schedule by selecting the periods corresponding to the lowest operating cost.

4. The controller operates CEE system for the next period (24 hours) based on the generated schedule.

In one example, scheduled operation requires oversizing the system to evaporate the same volume in a shorter time.

Hybrid Wind-Fan Operation

Wind energy can be used to assist with evaporation to reduce the electric energy consumed by the fan. CEE surfaces can be positioned to align parallel to the dominant wind direction. Wind can be directed, or allowed to pass through the surfaces for some part of a year. When wind direction aligns with CEE orientation, fan speed can be adjusted to compensate for the difference between the optimal air speed selected by the controller and the available wind speed. The hybrid wind-fan operation control can be configured to reduce costs. In one configuration, if the wind direction aligns with the orientation of the CEE, then the electric fan speed can be set equal to the difference between an optimal air speed and the available wind speed. In one configuration, if the wind direction does not align with the orientation of the CEE, then the electric fan speed can be set equal the optimal air speed. This operation scenario allows CEE to harness the natural drying power of wind, when available, making CEE more sustainable and energy-efficient.

Operation Strategies

Four operation strategies can be considered: (A) time invariant operation, in which the system is optimized based on static predefined ambient conditions and the operating variables remains constant all over the operation duration, (B) time-varying operation, in which the controller receives ambient conditions during each time interval and updates the operating variables to keep the system operating in a cost-optimal state, (C) scheduled operation, in which the controller specifies the optimal operation schedule to further reduce the operating cost (i.e. shut down during periods of high operating cost), and (D) hybrid wind-fan operation, in which air flow across the surfaces is induced by a combination of wind and fan.

One example considers a time-varying strategy under continuous 24 hour operation. The system is allowed to partially shut down some modules of the CEE and maintain continuous operation. A module can be shut down by closing a valve supplying liquid to an evaporator surface, by powering off a fluid pump supplying that evaporator surface, and by powering off a fan associated with the evaporator surface.

According to one example, the air speed through the evaporator modules is achieved only by electric fans. First, consider operating the CEE system under variable operating variables. Next, consider the scheduled operation, i.e., full shut down of the CEE system during periods of high energy consumption. Then, consider the effect of the hybrid wind-fan operation. The time invariant, continuous operation is considered as a benchmark base case to assess the cost saving achieved by the controller.

Figure 19:
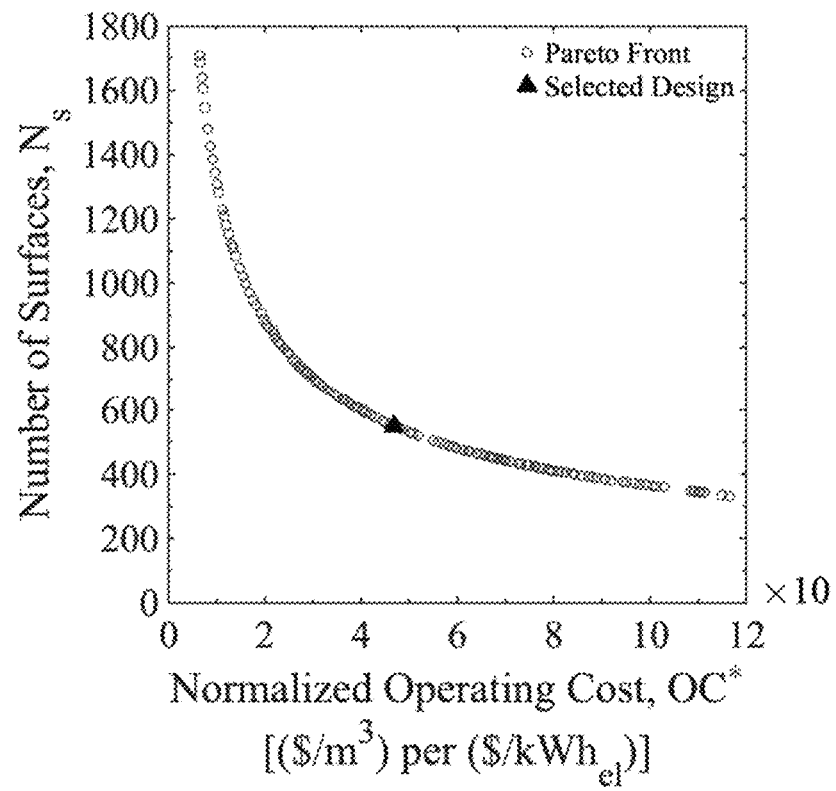
FIG. 19 illustrates Pareto fronts, according to one example.

FIG. 19 illustrates Pareto front of an example installation obtained under static ambient conditions for a particular location. The normalized costs (OC*) can be multiplied by the electric energy unit cost, $K_{el}$, to obtain the cost in $/m^3$ (example value for Kei is $0.1/kWh_{el}$).

The design marked by a black triangular marker is selected as an example of CEE system, and its corresponding operating variables represent the time-invariant operation. According to some examples, the controller can be utilized to control the operation of the selected design.

Continuous Time-Varying Operation

Figure 20A:
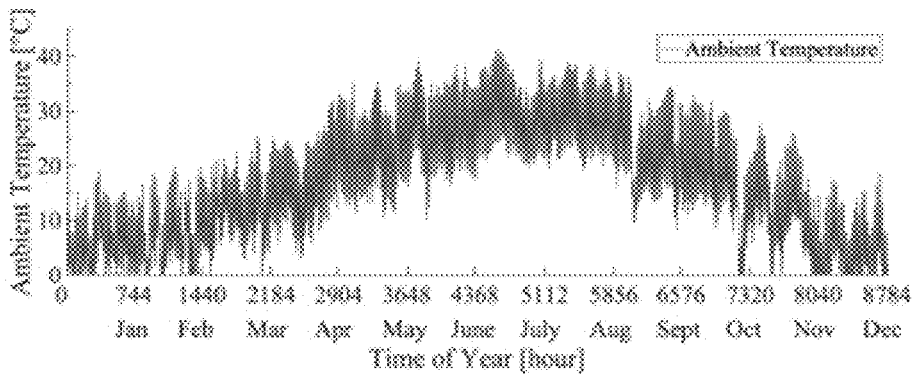
FIGS. 20A, 20B, and 20C illustrates temperature, humidity, and costs over a year, according to various examples.
Figure 20B:
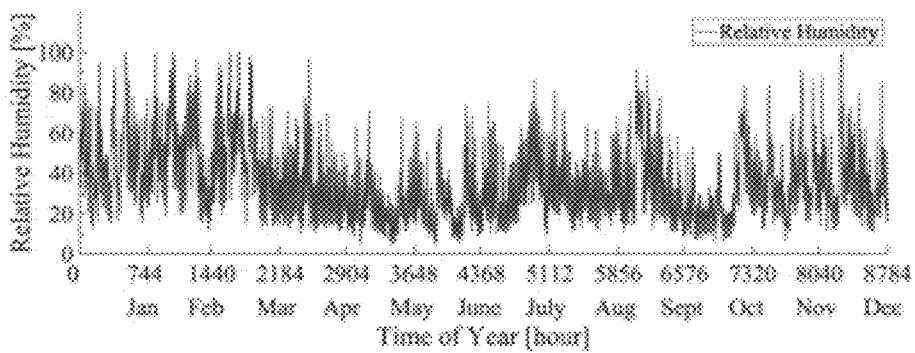
Figure 20C:
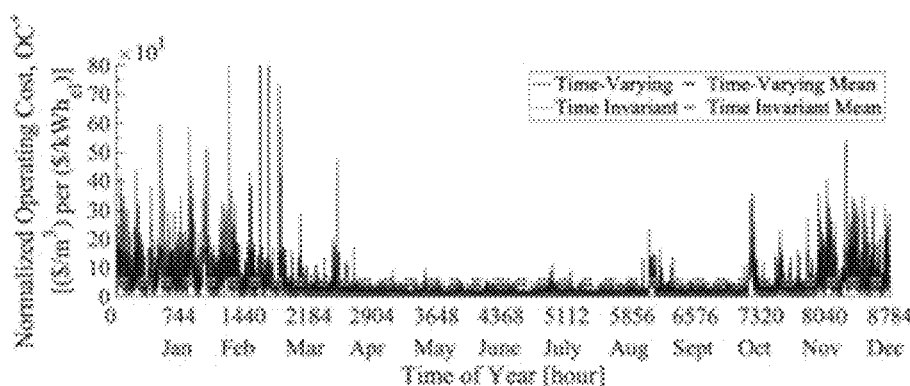

FIGS. 20A, 20B, and 20C illustrates temperature, humidity, and costs over a year, according to various examples.

FIG. 20A illustrates a one-year ambient temperature hourly profile in an example geographic location. FIG. 20B illustrates a one-year ambient relative humidity hourly profile in an example geographic location. FIG. 20C illustrates a comparison of hourly normalized operating costs between time-varying and time invariant operation strategies.

The first example comparing the optimal time-varying operating variables against the static time invariant operation. The system operates continuously over 24 hours per day. According to one example, FIG. 20C shows a comparison of hourly normalized operating cost between the time-varying and time invariant operation strategies. The time-varying strategy results in lower hourly and annual normalized operating cost because the system is actively optimized and operating on cost optimal conditions in the time-varying strategy. The hourly values can be averaged to obtain the monthly operating costs for both cases.

Figure 21:
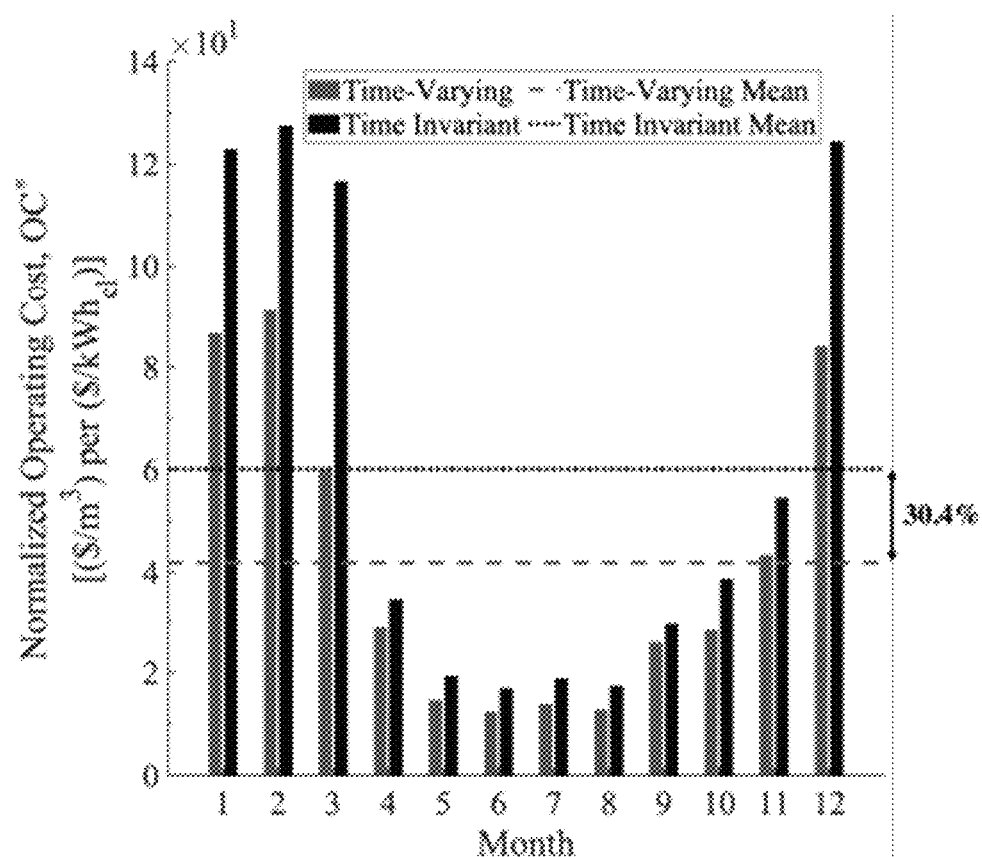
FIG. 21 illustrates monthly costs between the time-varying and time invariant operation strategies, according to various examples.

According to one example, FIG. 21 shows a monthly comparison between the time-varying and time invariant strategies and the annual average costs. The annual savings in the normalized operating cost achieved by the controller is 30.4% (from 6 to 4.2 ($/m^3$) per ($/kWh_{el}$)). FIG. 21 illustrates monthly comparison of operating costs between the time-varying and time invariant operation strategies.

Scheduled Operation

In one example, the present subject matter can be configured to allow the system to operate at an optimal operation schedule in addition to the optimal time varying variables (i.e., shut down during periods of high operating cost). The controller is enabled to select the 12 hour operating window having the lowest operating cost.

Figure 22A:
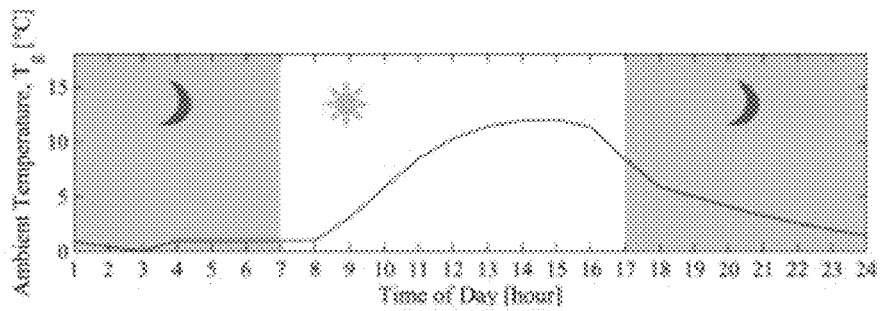
FIGS. 22A, B, C, and D illustrate temperature, humidity, and costs by hour, according to various examples.

An illustrative 24 hour day example is shown in FIG. 22A (ambient temperature hourly profile), 22B (ambient relative humidity hourly profile), 22C (single day comparison of hourly operating cost between time-varying and time invariant strategies), and 22D (scheduled operation of comparison of hourly operating cost between time-varying and time invariant strategies).

Due to the high humidity during the most of night hours (see FIG. 22B), the operating cost during these hours is the highest. To reduce operating cost, the present subject matter is operated over a 12-hour period (from 9 to 20) when the humidity is lower, and powered down during the rest of the day. To maintain the same evaporation target per day, the evaporation rate during the operation hours is doubled by doubling the system size, which in turns doubles the capital cost. FIG. 22D shows the resulting normalized operating cost after applying the modified schedule, according to one example. As shown, the daily average operating cost was reduced by 82.8% on this day (from 8.4 to 1.4 ($/m^3$) per ($/kWh_{el}$)) due to the combination of time-varying strategy and the scheduled operation.

FIG. 22A illustrates an example of a one-year ambient temperature hourly profile in a selected location.

Figure 22B:
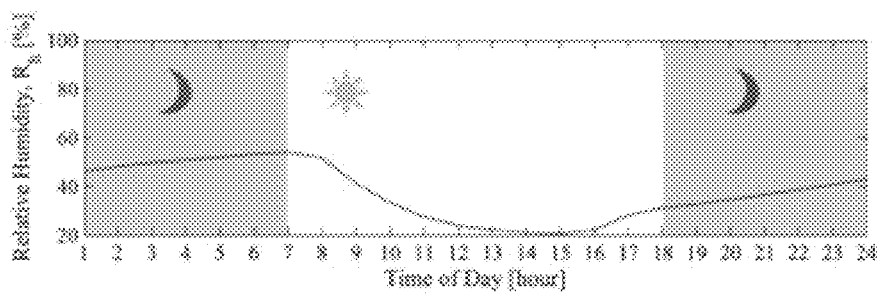

FIG. 22B illustrates an example of a one-year ambient relative humidity hourly profile in a selected location.

Figure 22C:
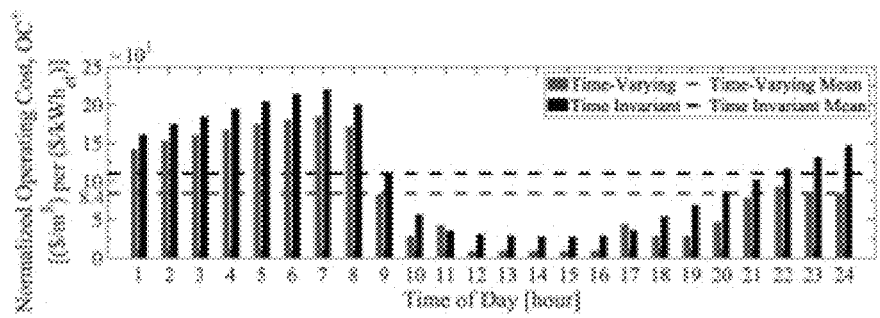
Figure 22D:
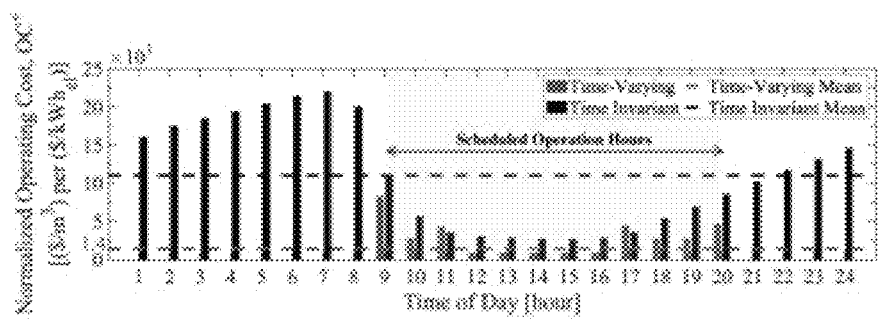

FIG. 22C illustrates a comparison of hourly normalized operating cost between time-varying and time invariant operation.

FIG. 22D illustrates scheduled operation, according to one example.

Figure 23:
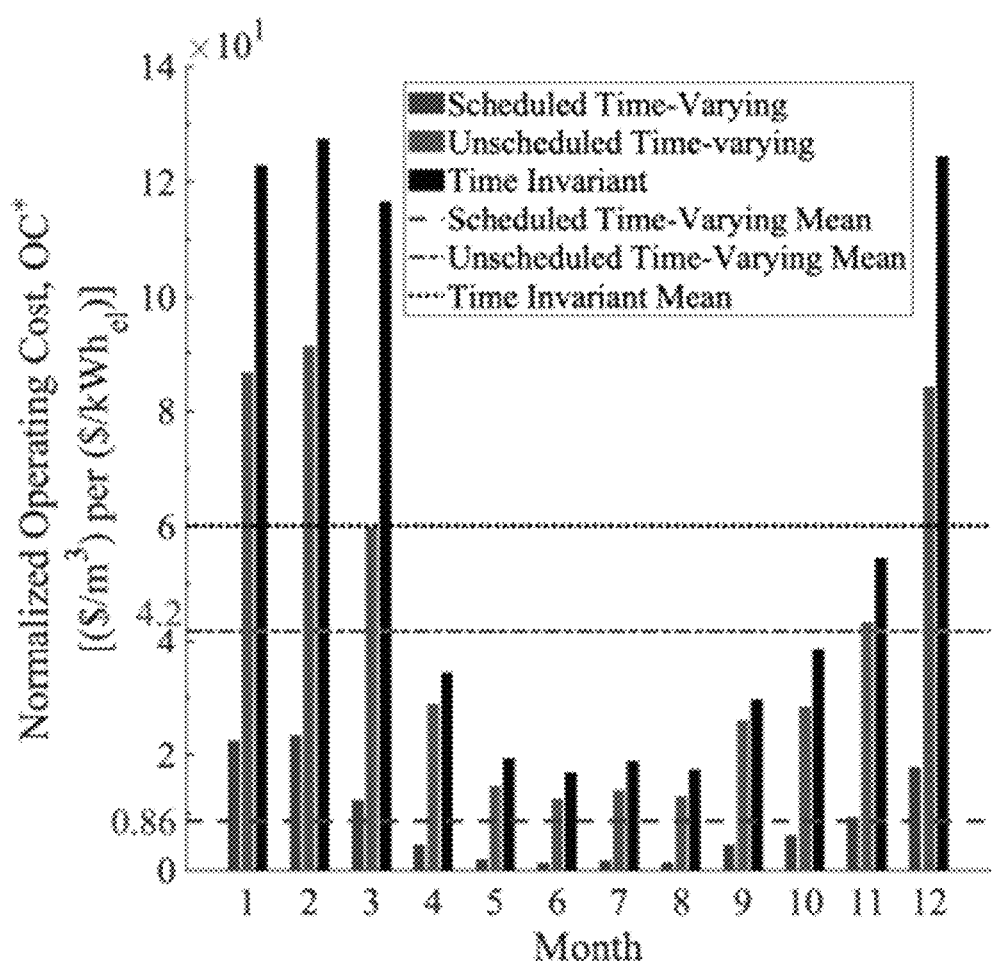
FIG. 23 illustrates monthly normalized costs, according to various examples.

FIG. 23 shows a comparison in the annual normalized operating cost after combining the time-varying strategy with the scheduled operation scenario. According to one example, scheduled operation along with the time-varying operation strategy can reduce the normalized operating cost by 85.7% (from 6 to 0.86 ($/m$^3$) per ($/kWh$_{el}$)).

The system size (number of evaporators, capacity) can be increased to compensate for the time during which the system is powered off. Notwithstanding the increased capital cost for an oversized system, the savings in operating cost can be significant since the operating cost dominates the capital cost.

Figure 24:
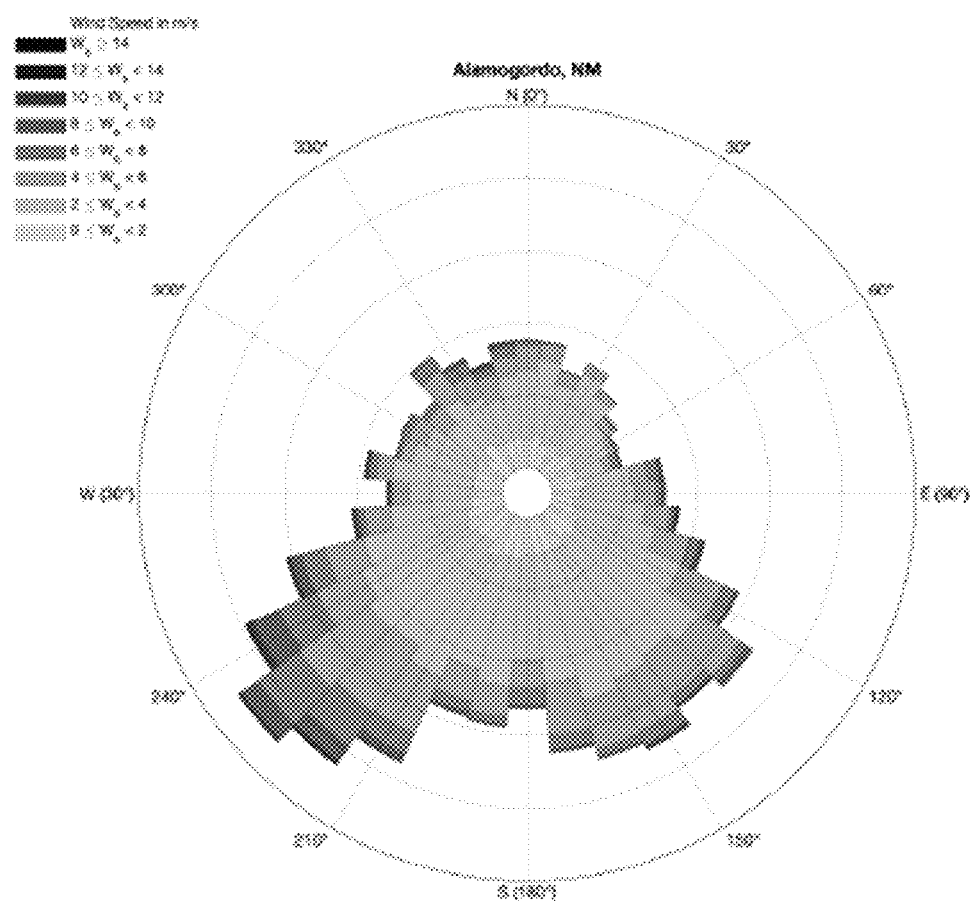
FIG. 24 illustrates an example of a wind rose for a selected site.

According to some examples, FIG. 24 shows the percentage increase in the capital cost and decrease in the total cost due to oversizing the system in the scheduled operation at distinct values of material cost ratio, $r_1$. At a material cost ratio $r_1$=27.5 kWh$_{el}$/surface, the percentage increase in the capital cost due to oversizing the system is 5.8%, while the reduction in total cost is 69.1%.

As the material cost increases to 110 kWh$_{el}$/surface, the increase in the capital cost become 19.8%, while the reduction in total cost is still dominating (44%). This trend changes at high material cost ratios (greater than 220 kWh$_{el}$/surface) after which the increase in capital cost due to oversizing become larger than the savings in the total cost. Therefore, for low material cost ratios (less than 220 kWh$_{el}$/surface), scheduled operation with oversized system can be economically beneficial.

Hybrid Wind-Fan, Time-Variant, Continuous Operation

According to one example, a hybrid wind-fan operates in continuous time-variant mode. The controller actively optimizes the operating variables, and the system operates continuously for 24 hours.

FIG. 23 illustrates monthly normalized operating cost of scheduled time-varying, unscheduled time-varying, and time-invariant scenarios.

FIG. 24 illustrates a sample wind rose showing wind speed and direction profile over the course of a year for a selected location. In the example shown, the wind direction is dominated towards the south over the angle range 120° to 240°. The CEE system can be aligned to naturally direct air across the evaporators. In hours when wind direction aligns with CEE orientation, the electric energy consumption corresponds to the difference between the hourly available wind speed and the hourly optimal speed value determined by the time-variant strategy. A figure shows the monthly normalized operating cost according to one example. The hybrid operation has reduced the electric energy consumption resulting in a 14% reduction in operating cost (from 4.183 to 3.590 ($/m$^3$) per ($/kWh$_{el}$)).

Cost Comparison Between Different Strategies

Figure 25:
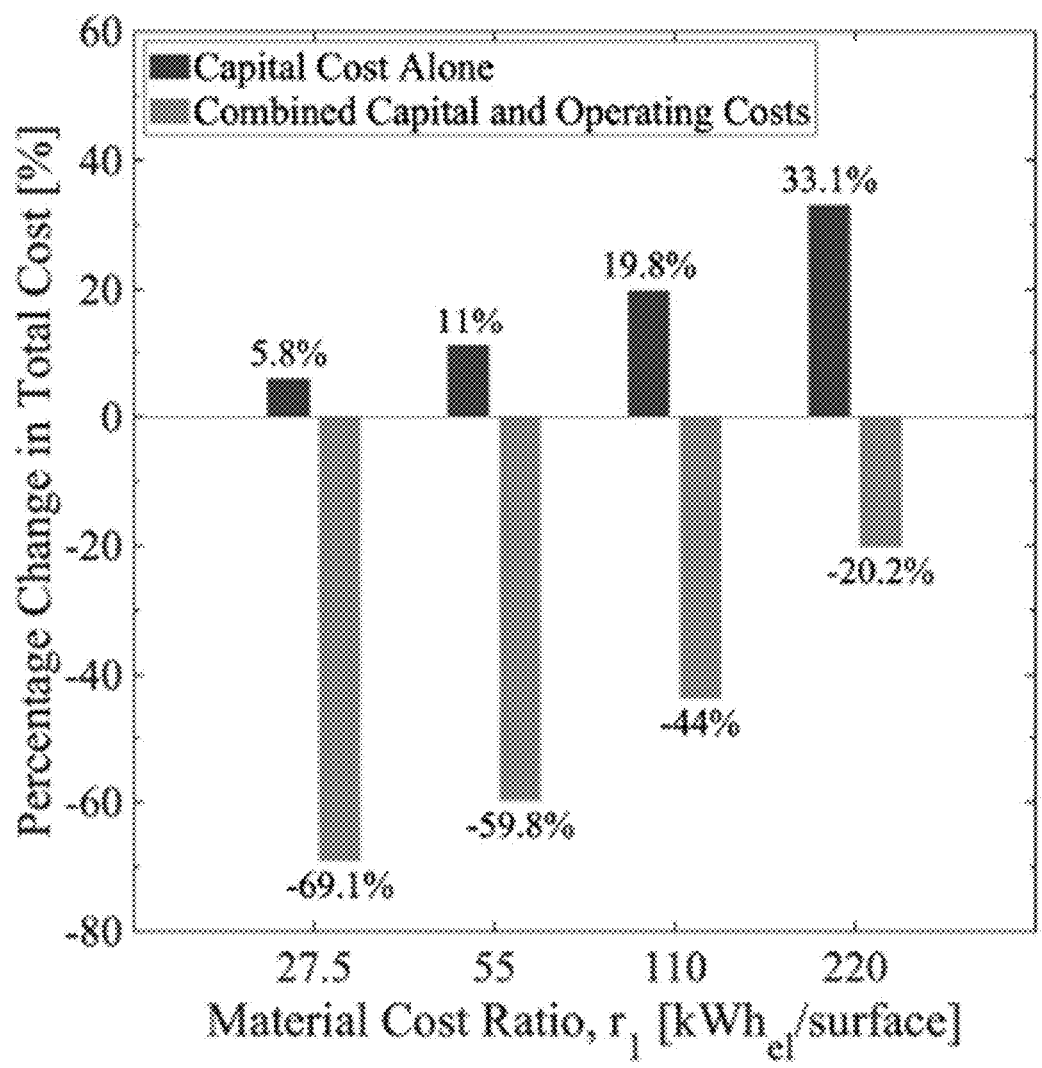
FIG. 25 shows the capital, operating and material costs, according to various examples.

FIG. 25 and Table 2 show the effect of each operation strategy on the achieved cost saving. The benchmark base case (continuous time invariant operation) results in the highest costs with a total cost of $6/m$^3$ and annual average operating cost of $6.52/m$^3$. The continuous time varying has reduced the operating cost to $4.18/m$^3$ corresponding to 30% operating cost reduction at no additional capital cost. The hybrid, time varying, continuous operation achieves a reduction in operating cost of 41% ($3.5/m$^3$). The scheduled, time varying operation has the highest effect on operating cost significantly reducing it to $0.86/m$^3$, while slightly doubling the capital cost, but still resulting in a 70% reduction in the total cost. Finally, combining all the strategies together (scheduled, hybrid, time varying operation) achieved an operating cost of $0.59/m$^3$ and total cost of $1.63/m$^3$ corresponding to 75% reduction in total cost.

Scheduled operation with an oversized system can be found to be the strategy with highest reduction in the total cost of the CEE system. The highest electric energy saving can be achieved when oversizing the system and allowing it to shut down at times of high energy costs.

TABLE 2

| Operation Strategy | Average Operating Cost ($/m$^3$) | Capital Cost ($/m$^3$) | Total Cost ($/m$^3$) |
|---|---|---|---|
| Time invariant (benchmark) | 6.0 | 0.52 | 6.52 |
| Continuous, time varying | 4.18 | 0.52 | 4.7 |
| Hybrid, continuous, time varying | 3.5 | 0.52 | 4.02 |
| Scheduled, time varying | 0.86 | 1.04 | 1.89 |
| Scheduled, hybrid, time varying | 0.59 | 1.04 | 1.63 |

FIG. 25 illustrates monthly normalized operating cost of scheduled time-varying, unscheduled time-varying, and time-invariant scenarios.

Remarks

A time-dependent data-driven control method to optimization the operation of CEE system under time-varying weather conditions is presented. Cost saving achieved in different strategies were discussed. The main conclusions are:

Time-varying operation includes receiving the ambient temperature and humidity during each time interval and optimizing the CEE system operation accordingly. This strategy results in operating cost savings of 30.4% (from 6 to 4.2 ($/m$^3$) per ($/kWh$_{el}$)).

Scheduled operation includes shutting down the system at time periods having high operating cost and compensating the decrease in evaporation rate during other periods by in-620 creasing the system size. This resulted in a reduction of 71% in the total cost (from 6.52 to 1.89 ($/m$^3$) per ($/kWh$_{el}$)).

Hybrid operation includes utilizing wind availability to reduce the electric energy consumption of the fan. An operating cost reduction of 42$ (from 6.0 to 3.5 ($/m$^3$) per ($/kWh$_{el}$))

Scheduled operation strategy found to give the highest cost reduction (at low material cost ratios).

The cost-saving potentials achieved makes CEE a cost-effective brine treatment technology, capable of optimizing itself and adapting to ambient condition fluctuations.

Figure 26:
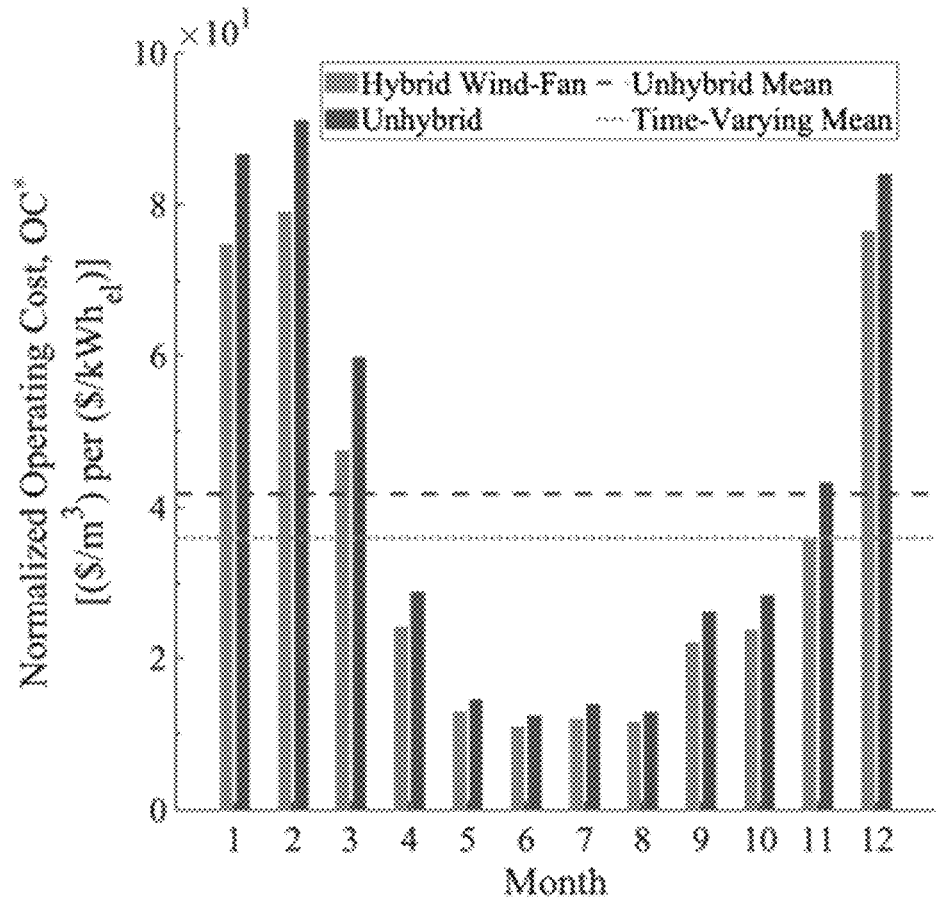
FIG. 26 illustrates monthly normalized operating cost for hybrid wind-fan, continuous, time-variant operation, according to one example.

FIG. 26 illustrates monthly normalized operating cost for hybrid wind-fan, continuous, time-variant operation.

Figure 27:
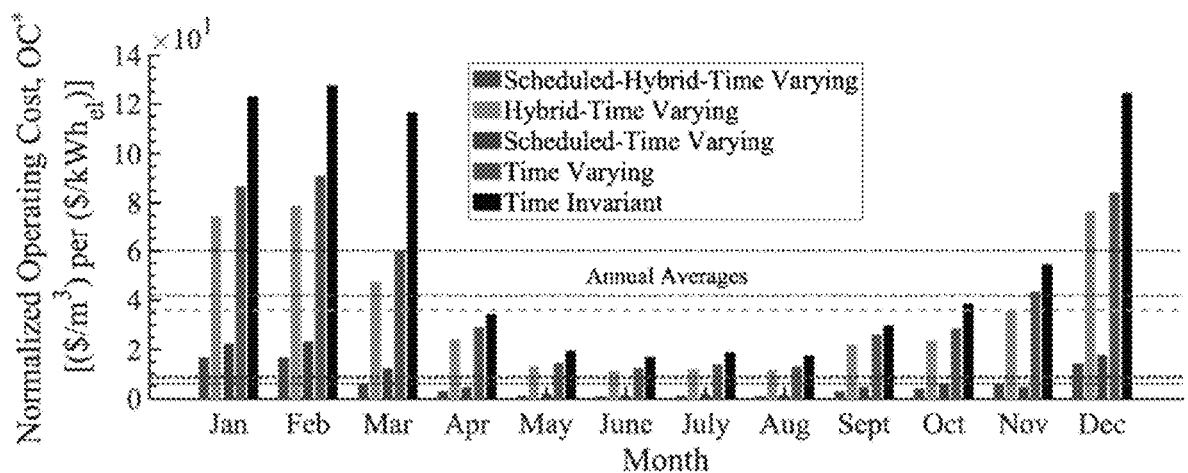
FIG. 27 illustrates monthly normalized operating cost for various operation strategies, according to one example.

FIG. 27 illustrates a summary of monthly normalized operating cost for various operation strategies.

Figure 28A:
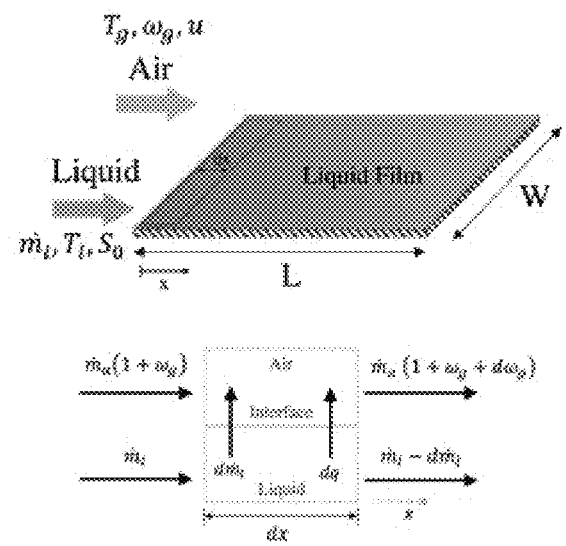
FIGS. 28A and 28B illustrates surface orientation and geometry, according to various examples.
Figure 28B:
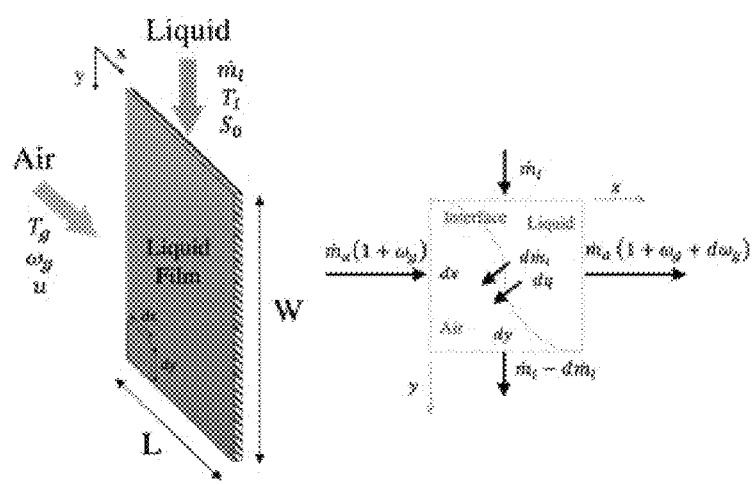

FIGS. 28A and 28B illustrate variations in flow configurations and their associated control volumes for an individual evaporation surface. Mass and heat transfers are shown for: (FIG. 28A) parallel-flow with a horizontal surface, and (FIG. 28B) cross-flow with a vertical surface. Note that the mathematical modeling presented for both the parallel and cross-flow configurations is independent of the surface orientation. An evaporative surface and flow direction can be aligned for parallel-flow or cross-flow, and tailored for double-sided wetting of the surfaces or single-sided wetting.

Nomenclature

A evaporation surface area, in m$^2$ $c_p$ specific heat, in J/kg K

CC annualized capital cost, in $/year
CC* normalized capital cost, in ($/year) per ($/Whet)
$C_{sur}$ material cost of an evaporation surface, in $/surface
$C_{fan}$ cost of a fan, in $/fan
d vertical spacing between surfaces, in m
$E_{vap}$ evaporation rate, in kg/s
h heat transfer coefficient, in W/m² K
i specific enthalpy, in J/kg
j interest rate, in %
k mass transfer coefficient, in kg/m² s
$k_{el}$ cost of electric energy unit, in $/Wh$_{el}$
i material cost per evaporation surface, in $/surface
$k_{th}$ cost of thermal energy unit, in $/Wh$_{th}$
L evaporation surface length, in m
ṁ mass flow rate, in kg/s
n life time, in years
$N_{fan}$ total number of fans
$N_{sur}$ total number of evaporation surfaces
$N_{sl}$ number of evaporation surfaces per evaporation module
OC annual operating cost, in $/year
OC* normalized operating cost, in ($/year) per ($/Wh$_{el}$)
P power consumption, in W
Δp pressure drop, in Pa
$r_1$ material cost ratio, in Wh$_{el}$/surface
$r_2$ energy cost ratio
Rh relative humidity, in %
T temperature, in K
ΔT temperature difference, in K
Δt operation time during of one year, in hr
TC* normalized total cost, in ($/year) per ($/Wh$_{el}$)
u air speed, in m/s
V̇ volumetric flow rate, in m³/s
W evaporation surface width, in m
Greek symbols η$_{fan}$ fan efficiency %
ω moisture content kg/kg Various Notes In one example, a non-transitory computer-readable medium is configured to store computer-executable instructions. The instructions, when executed by a computer, cause the computer to perform a method. The method includes receiving material and energy cost ratios corresponding to an evaporation system in an environment. The method includes receiving a performance prediction model for the evaporation system. The model includes data corresponding to evaporation rate, energy consumption and cost. The method includes performing optimization simulations for different combinations of ambient conditions of temperature and humidity, and determining cost-optimal control settings corresponding to liquid and air flow rates and temperatures for each combination. The method includes storing the cost-optimal control settings for different system sizes as a function of corresponding selected ambient combinations in a database. The method includes implementing the generated database of cost-optimal operation designs in the controller memory. The method includes receiving data corresponding to weather forecast for a subsequent period and size of the system in the environment. The method includes identifying a cost-optimal duty cycle. The method includes receiving data corresponding to current weather conditions. The method includes selecting, based on the received data of current weather conditions, at least one of an evaporator operational mode, a fluid flow rate, a temperature, and an air flow rate, wherein the fluid flow rate corresponds to fluid flow across an evaporation surface of the evaporation system, the temperature corresponds to a thermal element, the thermal element corresponding to a fluid temperature, an air temperature, or an evaporation surface temperature. The method includes operating the evaporation system based on the selected control settings, then receiving a new data corresponding to weather forecast for the next subsequent period and repeating the subsequent steps.

In one example, the non-transitory computer-readable medium is configured such that receiving material and energy cost ratios corresponding to the evaporation system includes a system comprising a plurality of evaporator modules and one or more monitoring devices configured to measure values of at least ambient temperature and relative humidity and a controller coupled to at least the evaporator modules and the monitoring devices, the controller having a processor configured to access a memory having stored instructions, the instructions configured to select an operating parameter In one example, the non-transitory computer-readable medium is configured for formulating the cost objective functions as cost ratios instead of absolute costs.

In one example, the non-transitory computer-readable medium is configured such that receiving a performance prediction model for the evaporation system includes a computer executable software to simulate and predict the evaporation performance and energy consumption based on at least an ambient temperature, a relative humidity, a liquid temperature, a liquid flow rate, a liquid salinity, an air flow speed, and at least one of the dimensions of the evaporation system.

In one example, the non-transitory computer-readable medium is configured such that receiving a performance prediction model for the evaporation system includes receiving a plurality of characterizations of the evaporator.

In one example, the non-transitory computer-readable medium is configured such that storing the cost-optimal control settings for different system sizes includes database including a set of Pareto fronts of cost-optimal operation configurations of liquid and air flow rates and temperatures obtained from optimization simulation and wherein the database is stored in a memory accessible to the computer.

In one example, the non-transitory computer-readable medium is configured such that receiving data corresponding to weather forecast includes receiving at least one of a forecast ambient temperature and a forecast relative humidity.

In one example, the non-transitory computer-readable medium is configured such that identifying a cost-optimal duty cycle for a subsequent period corresponds to estimating the operation cost during each time interval of the subsequent period based on the database, and identifying the time intervals having lowest estimated cost, and operating the system for the subsequent period during the identified time intervals.

In one example, the non-transitory computer-readable medium is configured such that identifying a cost-optimal duty cycle for a subsequent period corresponds to powering off all the evaporation modules during time intervals corresponding to high operation cost to minimize system operating cost.

In one example, the non-transitory computer-readable medium is configured such that identifying a cost-optimal duty cycle for a subsequent period corresponds to optimizing the number of operating modules in which a number of modules is powered on while powering off the remaining modules to minimize system operating cost.

In one example, the non-transitory computer-readable medium is configured such that receiving data corresponding to current weather conditions includes receiving at least one of an ambient temperature and a relative humidity including real time data or historic data.

In one example, the non-transitory computer-readable medium is configured such that selecting the at least one of the fluid flow rate, the temperature, and the air flow rate includes identifying cost-optimal settings based on data and operating the system based on the accessed cost-optimal control settings.

In one example, the non-transitory computer-readable medium is configured such that selecting the at least one of the fluid flow rate, the temperature, and the air flow rate includes accessing the database memory at a closest value of the received current ambient conditions and system size, and adjusting the design operation point based on the Pareto fronts to minimize the operating cost given the size of evaporation system in an environment.

In one example, the non-transitory computer-readable medium is configured such that selecting the at least one of the fluid flow rate, the temperature, and the air flow rate includes selecting a system model from a plurality of models.

In one example, the non-transitory computer-readable medium is configured such that selecting at least one of an evaporator operational mode includes selecting an unpowered mode.

According to one example, the system is configured to optimize the operating settings (fluid flow rate, temperature, air speed) in real-time, based on time-varying ambient conditions.

According to one example, the system is configured to generate an optimal operation schedule allowing the system to power down at periods requiring high operating cost (energy cost), and to operate either fully or partially during other periods. This makes the controller to be predictive.

According to one example, a continuous, time-varying operation can reduce the annual average total cost by 30% (from $6/m$^3$ to $4.2/m$^3$).

According to one example, a scheduled, time-varying operation can achieve a cost reduction of 70%, with an operating cost of $0.86/m$^3$ and total cost of $1.4/m$^3$.

According to some examples, the evaporation surfaces can be arranged in a cross-flow or vertical alignment. As shown, the vertical alignment with double-sided wetting of the evaporation surfaces can reduce the footprint area up to 75% (i.e., lower capital cost).

In one example the system is configured to be set-up during an offline method, and following set-up, deployed for operating in accordance with selected parameters. During the set-up phase, a plurality of Pareto fronts are prepared and stored in memory. The Pareto fronts are, for example, associated with various combinations of ambient conditions, costs, and system dimensions (such as number of evaporation surfaces).

Later, during an evaporation operation, the system can be operated in a manner having parameters determined based on sensor data in view of a selected Pareto front. The controller executes an algorithm to select a particular Pareto front and adjusts the evaporator parameters to align with a selected constraint. For example, the controller can receive weather data (current or forecast, including temperature or relative humidity) and select a number of evaporation surfaces for operating the system in an efficient manner. In another example, the weather data may call for powering off the system, or a portion of the system, or operating selected elements of the system according to duty cycle. In one example, the costs associated with operating the evaporation system (such as material costs, energy costs) in a first set of ambient conditions can yield one operational schedule and the same costs (or a different set of costs) operating in a second set of ambient conditions can yield an operational schedule that differs from another schedule. In various configurations, the weather information or cost information, or other information is sampled or refreshed from time to time or in accordance with a predetermined schedule.

The models and various system configurations can be represented in the form of equations (expressing relationships among various parameters), in the form of tabular data, or in the form of graphical representations.

For example, a system can be operated in a first configuration under a first set of parameters and later, operated in accordance with a second configuration under a different set of parameters. The system dimensions can be changed according to selections made by a user or by a controller. The dimensions of an evaporator can be changed in various ways. For example, the number of evaporator surfaces can be changed by manipulating a valve to control fluid flow to an evaporator. In addition, electric power to a fan can be modulated (between fully on and fully off, or intermediate positions) in accordance with ambient conditions or cost constraints. Furthermore, a thermal element can be modulated to adjust a temperature (increase or decrease) in accordance with ambient conditions (such as temperature, humidity, sunlight, or wind direction and strength) or other cost constraints.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A non-transitory computer-readable medium storing computer-executable instructions that, when executed by a computer, cause the computer to perform a method, the method comprising:
    receiving material cost ratio and energy cost ratio corresponding to an evaporation system, the evaporation system having a plurality of surfaces, a fan, and a fluid distribution system including a valve and a pump;
    receiving a performance prediction model for the evaporation system, the model including data corresponding to evaporation rate, energy consumption and cost associated with the evaporation system;
    generating simulated performance data for combinations of ambient temperature and humidity and determining performance of the evaporation system corresponding to a plurality of fluid flow rates, operating temperature, and air speed rates for at least two combinations; and
    storing the plurality of fluid flow rates, operating temperature, and air speed rates for different system sizes as a function of ambient temperature and humidity.

2. The computer-readable medium of claim 1, wherein selecting the fluid flow rate, operating temperature, and air speed for the evaporation system includes:
    receiving current weather data and forecast weather data;
    selecting a duty cycle for the evaporation system; and
    operating the evaporation system at the selected duty cycle, a selected fluid flow rate, a selected operational temperature, and a selected air speed rate based on the current weather data and the forecast weather data.

3. A non-transitory computer-readable medium storing computer-executable instructions that, when executed by a computer, cause the computer to perform a method, the method comprising:
    receiving data corresponding to weather conditions;
    receiving a system model, the system model corresponding to a size of an evaporator; and
    selecting, based on the received data and the system model, at least one of an evaporator operational mode, a fluid flow rate, a temperature, and an air flow rate, the fluid flow rate corresponding to fluid flow across an evaporation surface of the evaporator, the temperature corresponding to a thermal element, the thermal element corresponding to a fluid temperature, an air temperature, or an evaporation surface temperature, and the air flow rate corresponding to air flow across the evaporation surface of the evaporator.

4. The non-transitory computer-readable medium of claim 3 wherein receiving the system model includes receiving a characterization of the evaporator corresponding to a cost function of the evaporator and at least one of a dimension of the evaporator, a fluid flow rate of the evaporator, a temperature of the evaporator, and an air flow rate of the evaporator.

5. The non-transitory computer-readable medium of claim 3 wherein receiving the system model includes receiving a plurality of characterizations of the evaporator.

6. The non-transitory computer-readable medium of claim 3 wherein selecting the at least one of the fluid flow rate, the temperature, and the air flow rate includes selecting a system model from a plurality of models.

7. The non-transitory computer-readable medium of claim 3 wherein selecting at least one of an evaporator operational mode includes selecting an unpowered mode.

8. The non-transitory computer-readable medium of claim 3 wherein selecting at least one of an evaporator operational mode includes selecting a duty cycle.

9. The non-transitory computer-readable medium of claim 3 wherein receiving data corresponding to weather conditions includes receiving at least one of a temperature and a relative humidity.

10. The non-transitory computer-readable medium of claim 3 wherein receiving data corresponding to weather conditions includes receiving at least one of a forecast temperature and a forecast relative humidity.

* * * * *